US012633980B2

(12) United States Patent
Raghavan et al.

(10) Patent No.: US 12,633,980 B2
(45) Date of Patent: May 19, 2026

(54) POST-ANALOG BEAMFORMED CHANNEL IMPULSE RESPONSE REPORTING FOR MULTIPLE USER MULTIPLE-INPUT-MULTIPLE-OUTPUT SCHEDULING AND BEAMFORMING

(71) Applicant: QUALCOMM Incorporated, San Diego, CA (US)

(72) Inventors: Vasanthan Raghavan, West Windsor Township, NJ (US); Mostafa Khoshnevisan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/829,458

(22) Filed: Sep. 10, 2024

(65) Prior Publication Data

US 2026/0074755 A1 Mar. 12, 2026

(51) Int. Cl.
*H04B 7/06* (2006.01)
*H04L 25/02* (2006.01)

(52) U.S. Cl.
CPC ......... *H04B 7/0617* (2013.01); *H04B 7/0695* (2013.01); *H04L 25/0212* (2013.01)

(58) Field of Classification Search
CPC .. H04B 7/0617; H04B 7/0695; H04L 25/0212
See application file for complete search history.

(56) References Cited

U.S. PATENT DOCUMENTS

| | | | |
|---|---|---|---|
| 11,258,496 B2 * | 2/2022 | Ciochina | H04B 7/0617 |
| 2021/0167996 A1 * | 6/2021 | Ratnam | H04B 7/0617 |
| 2024/0171244 A1 * | 5/2024 | Ganguly | H04B 7/0632 |
| 2024/0243791 A1 * | 7/2024 | Huang | H04B 7/063 |

* cited by examiner

*Primary Examiner* — Jean B Corrielus
(74) *Attorney, Agent, or Firm* — Harrity & Harrity, LLP

(57) ABSTRACT

Various aspects of the present disclosure generally relate to wireless communication. In some aspects, a user equipment (UE) may receive a first indication of a set of analog receive beams and an instruction to report one or more post-analog-beamformed channel impulse responses (CIRs) that are based at least in part on the set of analog receive beams. The UE may transmit a second indication of a CIR report that indicates the one or more post-analog-beamformed CIRs. Numerous other aspects are described.

20 Claims, 12 Drawing Sheets

900

910 — Receive a first indication of a set of analog receive beams and an instruction to report one or more post-analog-beamformed channel impulse responses (CIRs) that are based at least in part on the set of analog receive beams 920 — Transmit a second indication of a CIR report that indicates the one or more post-analog-beamformed CIRs Receive a first indication of a set of analog receive beams and an instruction to report one or more post-analog-beamformed channel impulse responses (CIRs) that are based at least in part on the set of analog receive beams

910

Transmit a second indication of a CIR report that indicates the one or more post-analog-beamformed CIRs

920

900

Transmit a first indication of a set of analog receive beams and an instruction to report one or more post-analog-beamformed channel impulse responses (CIRs) that are based at least in part on the set of analog receive beams

1010

Receive a second indication of a CIR report that indicates the one or more post-analog-beamformed CIRs

1020

1000

POST-ANALOG BEAMFORMED CHANNEL IMPULSE RESPONSE REPORTING FOR MULTIPLE USER MULTIPLE-INPUT-MULTIPLE-OUTPUT SCHEDULING AND BEAMFORMING

FIELD OF THE DISCLOSURE

Aspects of the present disclosure generally relate to wireless communication and specifically relate to techniques, apparatuses, and methods for post-analog-beamformed channel impulse response reporting for multiple user multiple-input-multiple-output scheduling and beamforming.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a user equipment (UE). The method may include receiving a first indication of a set of analog receive beams and an instruction to report one or more post-analog-beamformed channel impulse responses (CIRs) that are based at least in part on the set of analog receive beams. The method may include transmitting a second indication of a CIR report that indicates the one or more post-analog-beamformed CIRs.

Some aspects described herein relate to a method of wireless communication performed by a network node. The method may include transmitting a first indication of a set of analog receive beams and an instruction to report one or more post-analog-beamformed CIRs that are based at least in part on the set of analog receive beams. The method may include receiving a second indication of a CIR report that indicates the one or more post-analog-beamformed CIRs.

Some aspects described herein relate to an apparatus for wireless communication at a UE. The apparatus may include one or more memories and one or more processors coupled to the one or more memories. The one or more processors may be configured to cause the apparatus to receive a first indication of a set of analog receive beams and an instruction to report one or more post-analog-beamformed CIRs that are based at least in part on the set of analog receive beams. The one or more processors may be configured to cause the apparatus to transmit a second indication of a CIR report that indicates the one or more post-analog-beamformed CIRs.

Some aspects described herein relate to an apparatus for wireless communication at a network node. The apparatus may include one or more memories and one or more processors coupled to the one or more memories. The one or more processors may be configured to cause the apparatus to transmit a first indication of a set of analog receive beams and an instruction to report one or more post-analog-beamformed CIRs that are based at least in part on the set of analog receive beams. The one or more processors may be configured to cause the apparatus to receive a second indication of a CIR report that indicates the one or more post-analog-beamformed CIRs.

Some aspects described herein relate to a non-transitory computer-readable medium that stores a set of instructions for wireless communication by a UE. The set of instructions, when executed by one or more processors of the UE, may cause the UE to receive a first indication of a set of analog receive beams and an instruction to report one or more post-analog-beamformed CIRs that are based at least in part on the set of analog receive beams. The set of instructions, when executed by one or more processors of the UE, may cause the UE to transmit a second indication of a CIR report that indicates the one or more post-analog-beamformed CIRs.

Some aspects described herein relate to a non-transitory computer-readable medium that stores a set of instructions for wireless communication by a network node. The set of instructions, when executed by one or more processors of the network node, may cause the network node to transmit a first indication of a set of analog receive beams and an instruction to report one or more post-analog-beamformed CIRs that are based at least in part on the set of analog receive beams. The set of instructions, when executed by one or more processors of the network node, may cause the network node to receive a second indication of a CIR report that indicates the one or more post-analog-beamformed CIRs.

Some aspects described herein relate to an apparatus for wireless communication. The apparatus may include means for receiving a first indication of a set of analog receive beams and an instruction to report one or more post-analog-beamformed CIRs that are based at least in part on the set of analog receive beams. The apparatus may include means for transmitting a second indication of a CIR report that indicates the one or more post-analog-beamformed CIRs.

Some aspects described herein relate to an apparatus for wireless communication. The apparatus may include means for transmitting a first indication of a set of analog receive beams and an instruction to report one or more post-analog-beamformed CIRs that are based at least in part on the set of analog receive beams. The apparatus may include means for receiving a second indication of a CIR report that indicates the one or more post-analog-beamformed CIRs.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
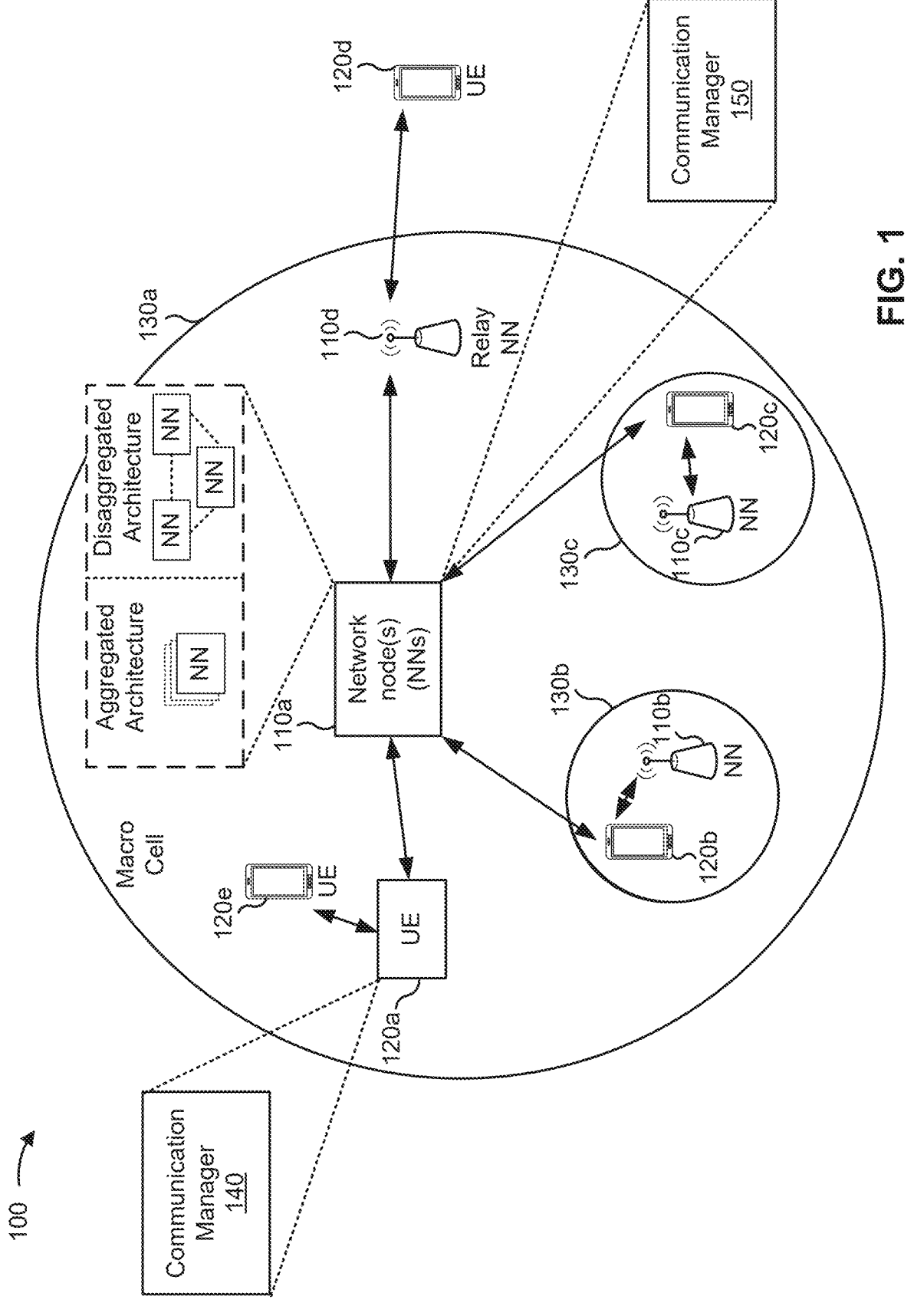
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In multiple user multiple-input-multiple-output (MU-MIMO), a network node may simultaneously serve multiple user equipments (UEs) using beamforming, spatial diversity, and/or polarization diversity. To illustrate, the network node may transmit first UE data that is associated with a first UE using a first beam, second UE data that is associated with the second UE using a second beam, and third UE data that is associated with the third UE using a third beam.

In some implementations of MU-MIMO, a network node may use enhanced Type-II feedback to configure digital beamforming that is used in the MU-MIMO communications. Example information that may be returned as part of enhanced Type-II feedback includes detailed feedback that is not included in other types of feedback reporting, such as preferred beamforming vectors (e.g., preferred precoding), per-antenna channel state information (CSI), per-beam CSI, sub-band level CSI, and/or sub-carrier level CSI. A network node receiving enhanced Type-II feedback may use the feedback to adjust various transmission parameters, such as a modulation order, a code rate, precoding, and/or a transmission power, to mitigate increased recovery errors, increased data transfer latencies, and/or reduced data throughput. While enhanced Type-II feedback may enable the network node to adjust transmission parameters, the information may include approximations that result in the network node selecting one or more sub-optimal transmission parameters that lead to increased recovery errors, increased data transfer latencies, and/or reduced data throughput relative to using more accurate information.

Various aspects relate generally to post-analog-beamformed channel impulse response (CIR) reporting. Some aspects more specifically relate to signaling between a network node and a UE that enables the network node to obtain CIR information from multiple UEs, and the CIR information may enable the network node to group UEs for MU-MIMO transmissions and/or to select optimal transmission parameters for the MU-MIMO transmissions. In some aspects, a UE may receive a first indication of a set of analog receive beams and an instruction to report one or more post-analog-beamformed CIRs that are based at least in part on the set of analog receive beams. The set of analog receive beams may be specific to the UE (e.g., UE-specific), and a post-analog-beamformed CIR may specify any combination of an amplitude, a phase, and/or a time delay that characterizes a wireless channel that is based at least in part on an analog beamformed signal. Based at least in part on receiving the first indication, the UE may transmit a second indication of a CIR report that indicates the one or more post-analog beamformed CIRs that are based at least in part on the set of analog receive beams.

In some aspects, a network node may transmit a first indication of a set of analog receive beams and an instruction to report one or more post-analog-beamformed CIRs that are based at least in part on the set of analog receive beams. The set of analog receive beams may be a first set of analog receive beams that is assigned to a first UE included in a group of UEs, and the network node may select a respective set of analog receive beams for each UE in the group of UEs to use for respective post-beamformed CIR reporting. Accordingly, the network node may transmit a respective beam set indication to each UE in the group of UEs, and the respective beam set indication indicates the respective set of analog receive beams that is associated with the respective UE and a respective instruction to use the respective set of analog receive beams for the respective post-analog-beamformed CIR reporting. The network node may receive at least a second indication of a CIR report that indicates the one or more post-analog-beamformed CIRs. For instance, the network node may receive a respective CIR report from each UE in the group of UEs, and the respective CIR report may be based at least in part on the respective set of analog receive beams associated with the UE.

Particular aspects of the subject matter described in this disclosure can be implemented to realize one or more of the following potential advantages. In some examples, by configuring a UE with a set of analog receive beams to use for CIR reporting, the described techniques can be used provide a network node with channel matrix information. In some aspects, a channel matrix may characterize propagation properties of a transmission channel between a set of transmitting antennas and a set of receiving antennas, and a CIR report from multiple UEs may provide at least some channel matrix information (e.g., by providing different CIRs for different channels and/or different antenna configurations) within the channel matrix. Using the channel matrix information, by way of the CIR report(s), a network node may select a MU-MIMO configuration and/or transmission parameters that result in decreased recovery errors, decreased data transfer latencies, and/or increased data throughput relative to only using enhanced Type-II feedback for selecting the transmission parameters and/or MU-MIMO configuration. For example, the network node may use the CIR reports to select groups of UEs to co-schedule for MU-MIMO communications, analog transmit beams, and/or analog receive beams for the MU-MIMO transmission that decrease recovery errors, decrease data transfer latencies, and/or increase data throughput. Alternatively, or additionally, the use of CIR reports from multiple UEs may simplify the process of obtaining channel matrix information at the network node. To illustrate, a network node may include a large MIMO array and/or a massive MIMO array that include tens to hundreds of antenna elements, respectively, and each UE may include varying numbers of antenna elements. Accordingly, characterizing each possible channel that is associated with a singular combination of a transmit antenna and a receive antenna to obtain a complete channel matrix in such a system may be impractical and/or unachievable given the large number of combinations. The use of CIR reporting enables the network node to obtain channel matrix information for particular configurations in a simplified manner, and to select an optimal, or near optimal, MU-MIMO configuration using the channel matrix information. Simplifying the process may make obtaining at least some channel matrix information realizable, may reduce power consumption at a network node, and/or may reduce a latency associated with obtaining the channel matrix information.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY)

layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as MU-MIMO. Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., a UE 120) may include a communication manager 140. As described in more detail elsewhere herein, the communication manager 140 may receive a first indication of a set of analog receive beams and an instruction to report one or more post-analog-beamformed channel impulse responses (CIRs) that are based at least in part on the set of analog receive beams; and transmit a second indication of a CIR report that indicates the one or more post-analog-beamformed CIRs. Additionally, or alternatively, the communication manager 140 may perform one or more other operations described herein.

In some aspects, a network node (e.g., a network node 110) may include a communication manager 150. As described in more detail elsewhere herein, the communication manager 150 may transmit a first indication of a set of analog receive beams and an instruction to report one or more post-analog-beamformed CIRs that are based at least in part on the set of analog receive beams; and receive a second indication of a CIR report that indicates the one or more post-analog-beamformed CIRs. Additionally, or alternatively, the communication manager 150 may perform one or more other operations described herein.

As indicated above, FIG. 1 is provided as an example. Other examples may differ from what is described with regard to FIG. 1.

Figure 2:
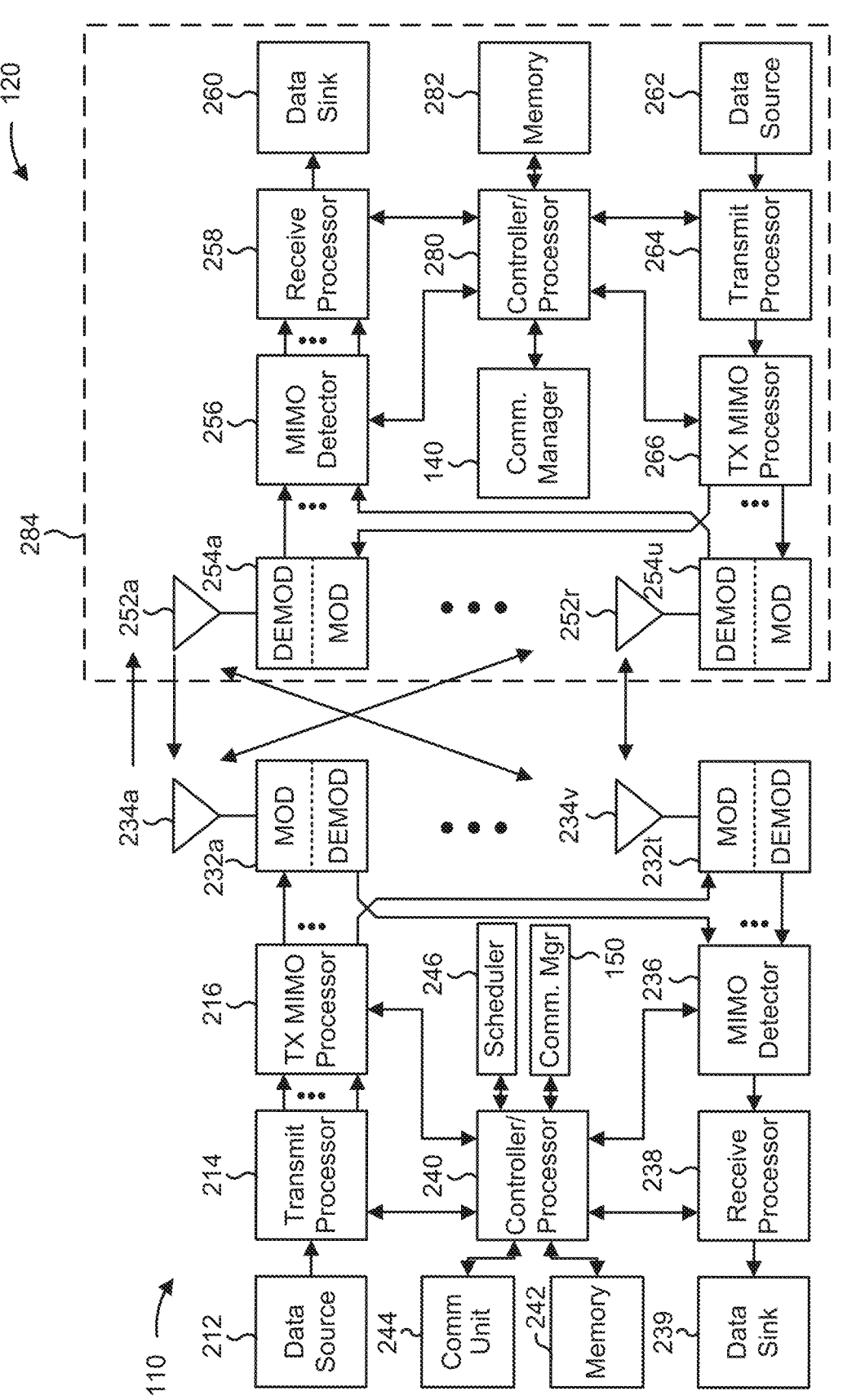
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a CSI reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
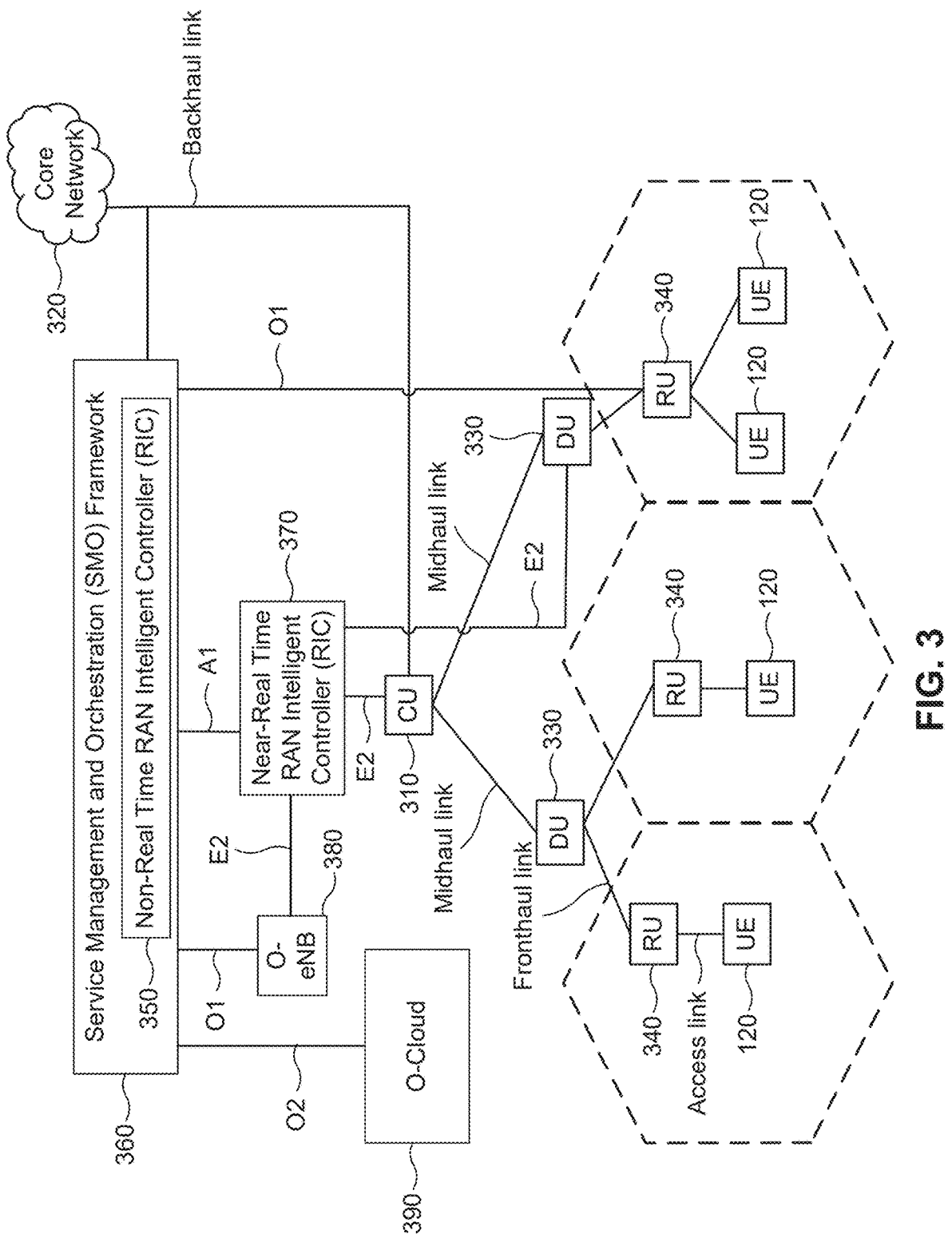
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with post-analog-beamformed CIR reporting for MU-MIMO scheduling and beamforming, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 900 of FIG. 9, process 1000 of FIG. 10, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 900 of FIG. 9, process 1000 of FIG. 10, or other processes as described herein. In some examples, executing instructions may include running the instructions, converting the instructions, compiling the instructions, and/or interpreting the instructions, among other examples.

In some aspects, a UE (e.g., a UE 120) includes means for receiving a first indication of a set of analog receive beams and an instruction to report one or more post-analog-beamformed CIRs that are based at least in part on the set of analog receive beams; and/or means for transmitting a second indication of a CIR report that indicates the one or more post-analog-beamformed CIRs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for transmitting a first indication of a set of analog receive beams and an instruction to report one or more post-analog-beamformed CIRs that are based at least in part on the set of analog receive beams; and/or means for receiving a second indication of a CIR report that indicates the one or more post-analog-beamformed CIRs. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figures 4A, 4B:
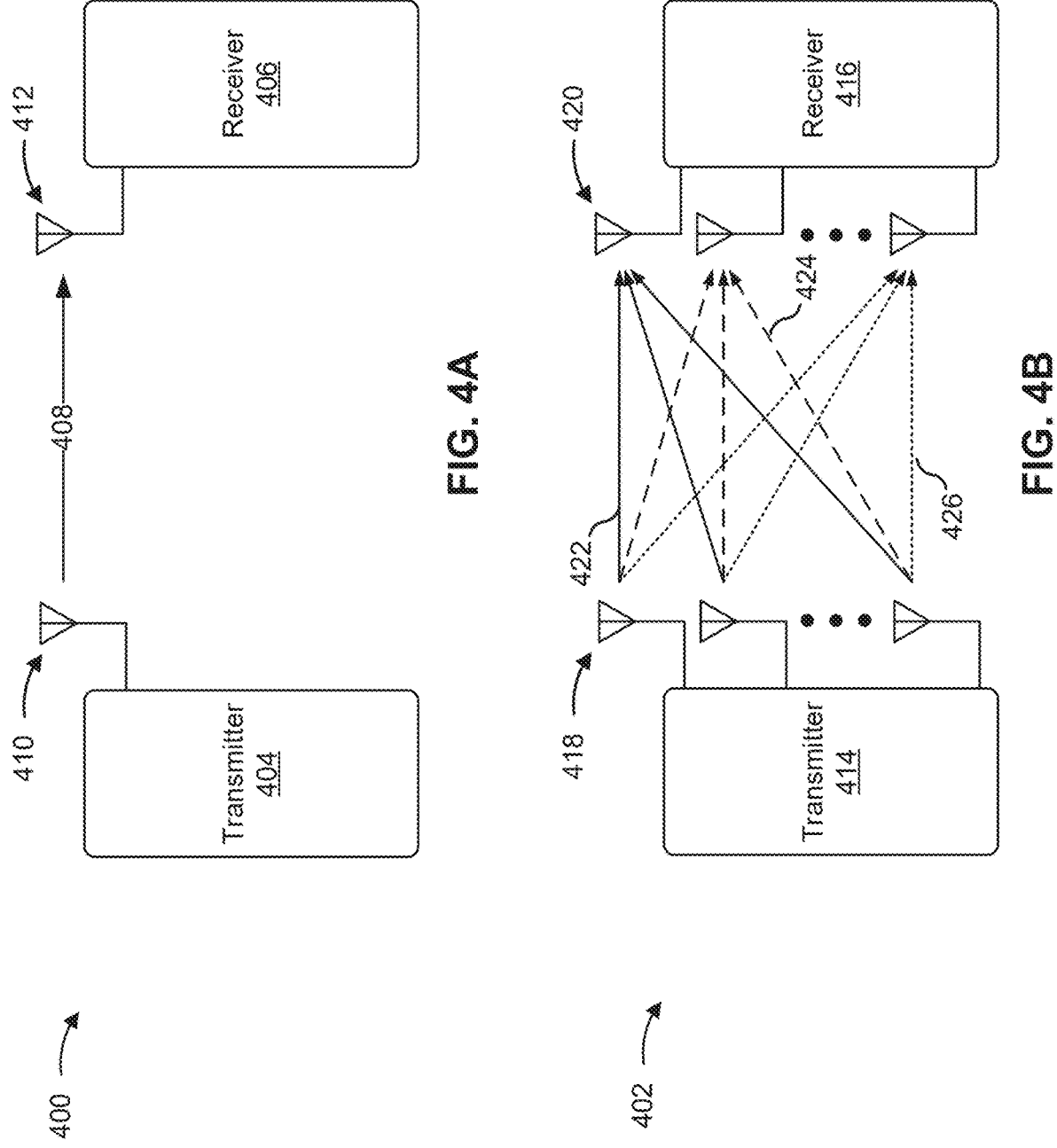
FIGS. 4A and 4B are diagrams illustrating a first example and a second example of a single-input-single-output system and a multiple-input-multiple-output (MIMO) system, respectively, in accordance with the present disclosure.

FIGS. 4A and 4B are diagrams illustrating a first example 400 and a second example 402 of a single-input-single-output (SISO) system and a MIMO system, respectively, in accordance with the present disclosure.

SISO systems and MIMO systems are two approaches to wireless communications. The use of a SISO system versus a MIMO system may depend on a variety of operating factors, such as requested data rates, data transfer latency operating conditions, implementation costs, and/or network access demand. A SISO system may provide a cost-effective solution for areas that have low network access demand, while a MIMO system may provide higher data throughput and/or lower data transfer latencies relative to a SISO system.

The first example 400 shown by FIG. 4A is an example SISO system that includes a transmitter device 404 (e.g., a network node 110 and/or a UE 120) that wirelessly communicates with a receiver device 406 (e.g., a network node 110 and/or a UE 120) based at least in part on transmitting a wireless signal 408. In the SISO system, the transmitter device 404 includes a first (single) antenna 410 that is used to transmit the wireless signal 408, and the receiver device includes a second (single) antenna 412 to receive the wireless signal 408. In the SISO system, the transmitter device 404 may communicate a single data stream to the receiver device 406 via the wireless signal.

The second example 402 shown by FIG. 4B is an example MIMO system that includes a transmitter device 414 (e.g., a network node 110 and/or a UE 120) and a receiver device 416 (e.g., a network node 110 and/or a UE 120). In the MIMO system, the transmitter device 414 and the receiver device 416 wirelessly communicate with one another based at least in part on multiple antennas. To illustrate, the transmitter device 414 may include M antennas as shown by reference number 418, and the receiver device 416 may include N antennas as shown by reference number 420, where M and N are integers that may be equal or different from one another (e.g., M=N, M>N, and/or M<N). For clarity, the second example 402 shows a transmitter in communication with a single receiver, but in other examples, the transmitter may serve and/or communicate with multiple receivers using the same antennas.

In some aspects, the transmitter device 414 may transmit multiple data streams via the M antennas based at least in part on using signal diversity, such as spatial diversity and/or polarization diversity. Typically, the number of data streams transmitted by a transmitter device is fewer than a number of antennas. That is, the mapping of the number of data streams to the number of antennas is not 1:1. Rather, each stream may be mapped with a unique set of weighs to all of the available antenna such that all of the available antennas are used to transmit the multiple data streams. To illustrate, the transmitter device 414 may transmit a first data stream 422 (shown with a solid line) using all of the M antenna and a first set of precoding weights. That is, each antenna of the M antenna may transmit a respective signal that carries the first data stream, and the respective signal may be precoded using a particular weight in the first set of precoding weights. Alternatively, or additionally, the transmitter device 414 may transmit a second data stream 424 (shown with a dashed line) using all of the M antenna and a second set of precoding weights and/or a third data stream 426 (shown with a dotted line) using all of the M antenna and a third set of precoding weights. Other examples may include the transmitter device 414 transmitting each data stream using a respective subset of antennas of the M antennas. "Analog beamforming" may denote signal manipulation (e.g., the application of precoding weights) in an analog domain and/or an RF domain, and "digital beamforming" may denote signal manipulation in a digital domain. A transmitter device (e.g., the transmitter device 414) may perform beamforming using analog beamforming, digital beamforming, and/or a combination of analog beamforming and digital beamforming.

"Spatial diversity" may denote spatially diverse signal transmissions. To illustrate, and as described above, the transmitter device 414 may apply precoding to multiple signals that, when summed together, form a first beam at a first carrier frequency, where the first beam propagates in a first direction with a first spatial beamwidth. For example, the precoding may adjust a respective phase and or amplitude of two or more signals that are transmitted by two or more antennas to constructively form the first beam, and the first beam may carry a first data stream. Alternatively, or additionally, the transmitter device 414 may apply precoding to multiple signals that, when summed together, form a second beam at a second carrier frequency (e.g., that may be the same carrier frequency as the first carrier frequency or a different carrier frequency from the first carrier frequency) that propagates in a second direction with a second spatial beamwidth. In some aspects, the second beam may carry a second data stream that is different from the first data stream. The transmitter device 414 may select the second propagation direction and/or the second spatial beamwidth to mitigate and/or avoid overlap with the first propagation direction and/or the first spatial beamwidth. That is, the first beam and the second beam may be spatially diverse based at least in part on propagating in non-overlapping directions with non-overlapping spatial beamwidths (or partially overlapping directions and/or spatial beamwidths).

"Polarization diversity" may denote at least two signals that have diverse polarizations. As one example, an electromagnetic (EM) wave may include an electric field (E-field) and magnetic field (H-field) that propagate along a same propagation line (e.g., a same direction) and are perpendicular to one another. For example, in an XYZ coordinate system that is characterized by an X-plane, a Y-plane, and a Z-plane that are perpendicular to one another, the E-field of the EM wave is separated from the H-field by 90 degrees. Accordingly, if an E-field that propagates along an X-axis with an amplitude that varies along the Y-axis (e.g., within a horizontal X-Y plane), the H-field may also propagate along the X-axis with an amplitude that varies along the Z-axis (e.g., in a perpendicular, vertical X-Z plane). In linear polarization, the E-field and the H-field may propagate without rotating around the propagation line, while in circular polarization, the E-field and the H-field may rotate around the propagation line. In some aspects, the transmitter device 414 may transmit a first signal that is based at least in part on a first carrier frequency and a first polarization. Alternatively, or additionally, the transmitter device 414 may transmit a second signal that is based at least in part on a second carrier frequency (e.g., that may be the same carrier frequency as the first carrier frequency or a different carrier frequency from the first carrier frequency) and a second polarization that is orthogonal to the first polarization. That is, the first signal and the second signal may have diverse polarizations. For example, the E-field of the first signal is orthogonal to the E-field of the second signal, and the H-field of the first signal is orthogonal to the H-field of the second signal. In some aspects, the first signal may carry first data, and the second signal may carry second data that is different from the first data. To illustrate, the transmitter device 414 may include at least a first antenna that is configured to generate a first signal that has a first polarization and a second antenna that is configured to generate a second signal that has a second polarization.

While the above example describes polarization with respect to orthogonal E-fields and orthogonal H-fields, other examples may use polarizations that are sufficiently decorrelated. For instance, two polarizations may be a complex weighted combination of E-field and H-field polarizations. As another example, the two polarizations may be based at least in part on a polarization distribution of the antenna elements in an antenna array. With enough decorrelation between polarizations, same of different spatial direction (e.g., transmit antenna weights), and same or different frequencies may be used for two transmission paths.

The demand for services provided by a wireless network continues to increase as more and more devices access the wireless network. A MIMO system may, in some cases, meet the demand based at least in part on the ability to simultaneously and/or contemporaneously transmit multiple data streams. To illustrate, and as described above, the use of multiple antennas in a MIMO system allows a transmitter device to simultaneously and/or contemporaneously transmit the multiple data streams using different paths (e.g., different spatial paths and/or different polarization paths), resulting in increased data throughput based at least in part on transmitting multiple data streams using diverse signals.

As indicated above, FIGS. 4A and 4B are provided as examples. Other examples may differ from what is described with regard to FIGS. 4A and 4B.

Figure 5:
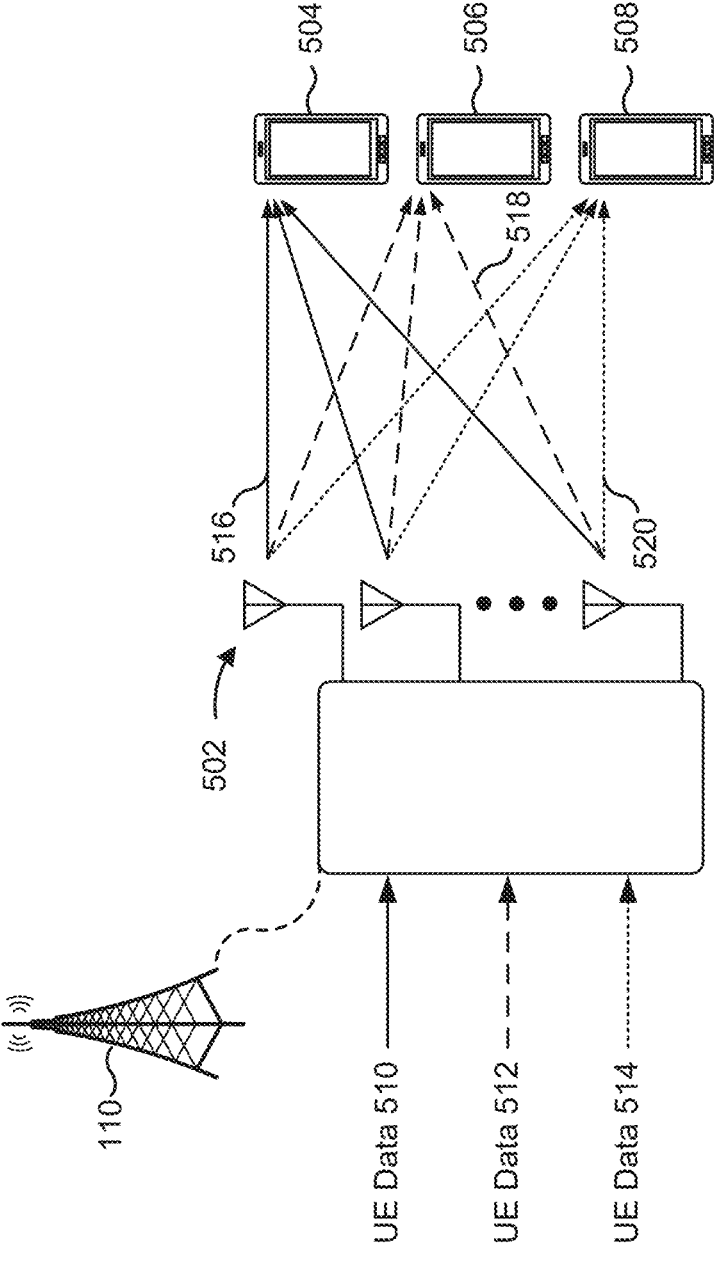
FIG. 5 is a diagram illustrating an example of multiple user (MU)-MIMO, in accordance with the present disclosure.

FIG. 5 is a diagram illustrating an example 500 of multiple user (MU)-MIMO, in accordance with the present disclosure.

In some examples of MU-MIMO, multiple UEs may be served simultaneously by a network node based at least in part on beamforming, spatial diversity (e.g., spatial multiplexing), and/or polarization diversity (e.g., polar multiplexing). To illustrate, a network node 110 may include multiple antenna 502 and beamforming capabilities as described with regard to FIG. 4B. The network node 110 may simultaneously serve a first UE 504, a second UE 506, and a third UE 508 using MU-MIMO communications. For example, the network node 110 may transmit first UE data 510 (shown with a solid line) that is associated with the first UE 504 using a first beam, second UE data 512 (shown with a dashed line) that is associated with the second UE 506 using a second beam, and third UE data 514 (shown with a dotted line) that is associated with the third UE 508 using a third beam. The network node 110 may form the first beam by applying first precoding to multiple signals (illustrated by FIG. 5 with solid lines) as shown by reference number 516 that, when summed together, form the first beam. In a similar manner, the network node 110 may form the second beam by applying second precoding to multiple signals (illustrated by FIG. 5 with dashed lines) as shown by reference number 518, and may form the third beam by applying third precoding to multiple signals (illustrated by FIG. 5 with dotted lines) as shown by reference number 520. The multiple signals that form the first beam, the multiple signals that form the second beam, and the multiple signals that form the third beam may be simultaneously emitted by one or more of the multiple antennas 502. The first beam, the second beam, and the third beam may use different carrier frequencies, may use a same carrier frequency, may use different air interface resources, and/or may use a same air interface resource.

In some implementations of MU-MIMO, a network node may use enhanced Type-II feedback to configure digital beamforming that is used in the MU-MIMO communications. Example information that may be returned as part of enhanced Type-II feedback includes detailed feedback that is not included in other types of feedback reporting, such as preferred beamforming vectors (e.g., preferred precoding), per-antenna CSI, per-beam CSI, sub-band level CSI, and/or sub-carrier level CSI. A network node receiving enhanced Type-II feedback may use the feedback to adjust various transmission parameters, such as a modulation order, a code rate, precoding, and/or a transmission power, to mitigate increased recovery errors, increased data transfer latencies, and/or reduced data throughput. While enhanced Type-II feedback may enable the network node to adjust transmission parameters, the information may include approximations that include errors, and the network node may select one or more sub-optimal transmission parameters that result in increased recovery errors, increased data transfer latencies, and/or reduced data throughput relative to using more accurate information.

Various aspects relate generally to post-analog-beamformed CIR reporting. Some aspects more specifically relate to signaling between a network node and a UE that enables the network node to obtain CIR information from multiple UEs, and the CIR information may enable the network node to group UEs for MU-MIMO transmissions and/or to select optimal transmission parameters for the MU-MIMO transmissions. In some aspects, a UE may receive a first indication of a set of analog receive beams and an instruction to report one or more post-analog-beamformed CIRs that are based at least in part on the set of analog receive beams. The set of analog receive beams may be specific to the UE (e.g., UE-specific), and a post-analog-beamformed CIR may specify any combination of an amplitude, a phase, and/or a time delay that characterizes a wireless channel that is based at least in part on an analog beamformed signal. Based at least in part on receiving the first indication, the UE may transmit a second indication of a CIR report that indicates the one or more post-analog beamformed CIRs that are based at least in part on the set of analog receive beams.

In some aspects, a network node may transmit a first indication of a set of analog receive beams and an instruction to report one or more post-analog-beamformed CIRs that are based at least in part on the set of analog receive beams. The set of analog receive beams may be a first set of analog receive beams that is assigned to a first UE included in a group of UEs, and the network node may select a respective set of analog receive beams for each UE in the group of UEs to use for respective post-beamformed CIR reporting. Accordingly, the network node may transmit a respective beam set indication to each UE in the group of UEs, and the respective beam set indication indicates the respective set of analog receive beams that is associated with the respective UE and a respective instruction to use the respective set of analog receive beams for the respective post-analog-beam-formed CIR reporting. The network node may receive at least a second indication of a CIR report that indicates the one or more post-analog-beamformed CIRs. For instance, the network node may receive a respective CIR report from each UE in the group of UEs, and the respective CIR report may be based at least in part on the respective set of analog receive beams associated with the UE.

Particular aspects of the subject matter described in this disclosure can be implemented to realize one or more of the following potential advantages. In some examples, by con-figuring a UE with a set of analog receive beams to use for CIR reporting, the described techniques can be used provide a network node with channel matrix information. In some aspects, a channel matrix may characterize propagation properties of a transmission channel between a set of trans-mitting antennas and set of receiving antennas, and a CIR report from multiple UEs may provide at least some channel matrix information (e.g., by providing different CIRs for different channels and/or different antenna configurations) within the channel matrix. Using the channel matrix infor-mation, by way of the CIR report(s), the network node may select a MU-MIMO configuration and/or transmission parameters that result in decreased recovery errors, decreased data transfer latencies, and/or increased data throughput relative to using enhanced Type-II feedback for selecting transmission parameters. For example, the network node may use the CIR reports to select groups of UEs to co-schedule for MU-MIMO communications, analog trans-mit beams, and/or analog receive beams for the MU-MIMO transmission that decrease recovery errors, decrease data transfer latencies, and/or increase data throughput. As one example, the CIR reports may enable the network node to co-schedule UEs that use MU-MIMO communications with compatible analog transmit beams and/or compatible analog receive beams that mitigate interference with one another. As another example, network node may select one or more communication beams (e.g., one or more network node transmit beams and/or one or more UE receive beams) to use for the MU-MIMO communications based at least in part on the CIR reports.

Alternatively, or additionally, the use of CIR reports from multiple UEs may simplify the process of obtaining channel matrix information at a network node. To illustrate, a net-work node may include a large MIMO array and/or a massive MIMO array that include tens to hundreds of antenna elements, respectively, and each UE may include varying numbers of antenna elements. Accordingly, charac-terizing each possible channel that is associated with a singular combination of a transmit antenna and a receive antenna to obtain a complete channel matrix in such a system may be impractical and/or unachievable given the large number of combinations. The use of CIR reporting enables the network node to obtain channel matrix informa-tion for particular configurations in a simplified manner, and to select an optimal, or near optimal, MU-MIMO configu-ration using the channel matrix information. Simplifying the process may reduce power consumption at a network node and/or may reduce a latency associated with obtaining the channel matrix information.

As indicated above, FIG. 5 is provided as an example. Other examples may differ from what is described with regard to FIG. 5.

28

Figure 6:
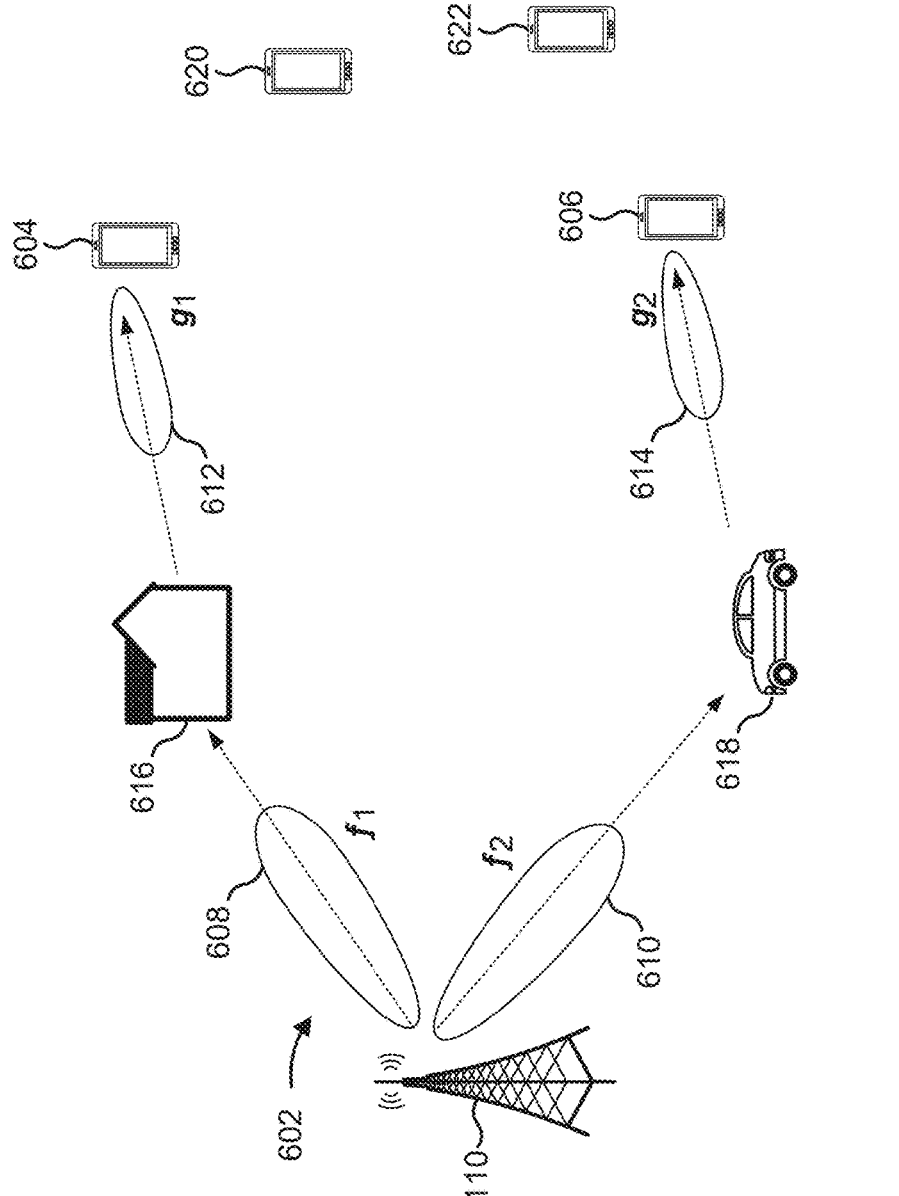
FIG. 6 is a diagram illustrating an example of MU-MIMO communications, in accordance with the present disclosure.

FIG. 6 is a diagram illustrating an example 600 of MU-MIMO communications, in accordance with the present disclosure.

A network node 110 may perform MU-MIMO commu-nications 602 to simultaneously serve a first UE 604 and a second UE 606. To illustrate, the network node 110 may transmit a first communication to the first UE 604 using a first transmit beam 608 and a second communication to the second UE 606 using a second transmit beam 610. The first UE 604 may receive the first communication using a first receive beam 612, and the second UE 606 may receive the second communication using a second receive beam 614. In some aspects, the transmit beams used by the network node 110 in the MU-MIMO communications 602 may not be reciprocal beams (e.g., aligned directionally) to the respec-tive analog receive beams used by the first UE 604 and the second UE 606. For instance, as shown by the example 600, the first transmit beam 608 may reflect off a first object 616 and/or the second transmit beam 614 may reflect off a second object 618, resulting in the transmit beams changing directions. However, in other examples, a transmit beam used by the network node 110 may be a reciprocal beam to a receive beam used by a UE, such as in a scenario where the network node 110 has a direct line-of-sight (LoS) to a UE.

The network node 110 may select the first UE 604 and the second UE 606 to schedule together for the MU-MIMO communications 602 based at least in part on analyzing channel matrix information that characterizes various com-munication paths between the network node 110 and mul-tiple UEs served by the network node. To illustrate, the network node 110 may serve the first UE 604, the second UE 606, a third UE 620, and a fourth UE 622. Generally, a channel matrix between a network node and a particular UE out of multiple UEs served by the network node for MU-MIMO may be represented as $H_i(n)$, where the subscript i denotes the i-th UE served by the network node, n represents an n-th sub-carrier, and n=1, . . . N denotes a frequency domain allocation for an entirety of the co-scheduled UEs. As described above, the channel matrix may be based at least in part on a number of transmit elements at the network node 110 and a number of receive elements at the multiple node 110 and a number of receive elements at the multiple UEs. Each element in the channel matrix may be associated with a respective path between one or more transmit antenna elements at the network node 110 and one or more receive antenna elements at a respective UE. An analog transmit beam (e.g., the first transmit beam 608 and/or the second transmit beam 610) used by the network node to commu-nicate with the i-th UE may be represented as an analog transmit beamforming vector $f_i$, (shown in FIG. 6 as $f_1$ and $f_2$) and an analog receive beam (e.g., the first receive beam 612 and/or the second receive beam 614) used by the i-th UE to communicate with the network node may be represented as an analog receive beamforming vector $g_i$ (shown in FIG. 6 as $g_1$ and $g_2$). Using the above notations, a sum rate (e.g., a total data throughput) that is averaged over the N subcar-riers for MU-MIMO may be calculated as:

$$\text{Rate} = \frac{1}{N}\sum_{n=1}^{N}\sum_{i=1}^{I}\log_2\left(1+\frac{|g_i^H H_i(n)f_i|^2}{1+\sum_{j\neq i}|g_i^H H_i(n)f_j|^2}\right) \quad (1)$$

The network node may perform a MU-MIMO selection procedure that enables the network node to select any combination of analog transmit beams, analog receive beams, and/or UEs to co-schedule for MU-MIMO communications and optimize (or nearly optimize) the sum rate. Alternatively, or additionally, two or more UEs may participate in the MU-MIMO selection procedure with the network node. As at least part of the MU-MIMO selection procedure, the network node may select a set of J analog transmit beams that may be represented as $\{\tilde{f}_1, \tilde{f}_2 \ldots \tilde{f}_j\}$, where $\tilde{f}_j$ represents an approximation of $f_j$ (e.g., an analog transmit beamforming vector), and $j=1 \ldots J$. That is, the network node may select a set of analog transmit beams to use in the MU-MIMO selection procedure. The set of analog transmit beams may be a subset of analog transit beams used by the network node for all of the UEs the network node serves. To illustrate the set of analog transmit beams may be a subset of SSB beams used by the network node or may be a set of non-SSB beams that the network node configures for performing a MU-MIMO selection procedure. In selecting and/or configuring the set of J analog transmit beams, the network node may select unitary beams (and/or approximately unitary beams) that satisfy the following equation:

$$\sum_{j=1}^{J} \tilde{f}_j \tilde{f}_j^{H} \approx I \tag{2}$$

In equation (2), $$\tilde{f}_j^{H}$$

is the Hermitian transpose of $\tilde{f}_j$, I is an identity matrix, and approximately unitary beams are beams that are nearly orthogonal to one another (e.g., orthogonal to within a threshold). Using unitary beams and/or approximately unitary beams as the set of J analog transmit beams may result in a set of analog transmit beams that span a transmit beam-space and/or a region of coverage of the network node (e.g., a full-dimensionality and/or full beam coverage of the region). In some aspects, the network node may select, as the set of J analog transmit beams, a set of analog transmit beams that cover a section and/or subregion of a coverage area provided by the network node. Using a set of analog transmit beams that are based at least in part on a section and/or subregion of a coverage area provided by the network node may reduce an amount of signaling used in the MU-MIMO selection procedure, reduce an amount of time to perform the MU-MIMO selection procedure, and/or reduce an amount of air interface resources used by the MU-MIMO selection procedure.

The network node may select, as the set of J analog transmit beams, a set of broadcast beams that span an entire frequency allocation available to the network node and/or used by the network node for serving UEs in a coverage area of the network node. As one example, the network node may select one or more synchronization signal block (SSB) beams to use as the set of J analog transmit beams. However, the network node may select one or more analog transmit beams that are not SSB beams. Accordingly, the set of J analog transmit beams may not include any SSB beams, may include some SSB beams, and/or may all be SSB beams.

Alternatively, or additionally, the network node may select and/or configure a respective set of analog receive beams for each UE included in a group of UEs. The group of UEs may be an entirety of UEs served by the network node, or may be a subset of the entirety of UEs served by the network node. For instance, the network node may select a subset of UEs that are within a subsection of a coverage area provided by the network node, a subset of UEs that the network node is (currently) co-scheduling for MU-MIMO communications, or a subset of UEs that the network node is evaluating for co-scheduling for MU-MIMO communications. Each set of analog receive beams may be UE-specific such that the network node selects a different set of analog receive beams for each UE in the group of UEs. A set of analog receive beams (e.g., the UE-specific set of analog receive beams) may be denoted as $\{g_{i,1}, \ldots, g_{i,L}\}$, where the first subscript i indicates the particular UE assigned to the set of analog receive beams (e.g., the i-th UE), the set of analog receive beam includes L analog beams (L being an integer), and the second subscript indicates a particular analog beam of the L analog beams that range from 1 to L. While the network node may select each set of analog receive beams, a UE (e.g., an i-th UE being evaluated) may indicate a recommended set of analog receive beams to the network node, and the network node may use the recommended set of analog receive beams as the UE-specific set of analog receive beams for the i-th UE. The network node may configure each UE with the respective set of analog receive beams by indicating the set of analog receive beams (e.g., in Layer 3 signaling, Layer 2 signaling, or Layer 1 signaling). To illustrate, the network node may indicate a respective beam index and/or may indicate a respective quasi-co-located (QCL) source for each beam included in the set of analog receive beams.

As part of the MU-MIMO selection procedure, the network node may transmit a respective downlink reference signal on each analog transmit beam in the set of analog transmit beams. Example downlink reference signals may include an SSB, a CSI-RS, and/or a DMRS. Alternatively, or additionally, each UE participating in the MU-MIMO selection procedure may generate one or more measurement metrics using the downlink reference signals transmitted by the network node, such as CSI, RSSI, signal-to-noise ratio (SNR), CQI, RSRP, signal-to-interference-plus-noise ratio (SINR), and/or RSRQ. In some aspects, each UE may generate a respective set of measurement metrics for each analog receive beam in the UE-specific set of analog receive beams assigned to the UE and a same analog transmit beam used by the network node to transmit the reference signal. The multiple measurement metrics may be based at least in part on multiple instances of the reference signal in different time partitions (e.g., different slots, different symbols, and/or different periodic intervals) and/or different frequency partitions (e.g., subcarriers). To illustrate, for a first reference signal transmitted by the network node using a first analog transmit beam, a UE may generate a first set of measurement metrics using a first analog receive beam and multiple instances of the first reference signal, and a second set of measurement metrics using a second analog receive beam and multiple instances of the first reference signal. For a second reference signal transmitted by the network node using a second analog transmit beam, the UE may generate a third set of measurement metrics using the first analog receive beam and multiple instances of the second reference signal, and a second set of measurement metrics using the second analog receive beam and multiple instances of the second reference signal. The first reference signal and the second reference signal may be a same reference signal (e.g., a same SSB) or different reference signals (e.g., different SSBs or different reference signal types). Other examples may include the network node continuously transmitting a single reference signal during multiple time partitions using a same analog transmit beam in each time partition or using a different analog transmit beam in each time partition. As another example, the network node may transmit a different reference signal during a respective time partition (e.g., using a same analog transmit beam or different analog transmit beams). The network node may simultaneously and/or contemporaneously transmit multiple reference signals using a respective analog transmit beam for each reference signal.

Each UE may calculate a respective CIR based at least in part on the reference signal(s), such as by calculating a post-analog-beamformed CIR that provides a CIR of a wireless channel and/or wireless channel characteristics that is/are based at least in part on an analog beamformed signal. As one example, each UE may calculate a frequency domain average post-analog-beamformed CIR as follows:

$$s_{i,l,j} = \frac{1}{|Coh|} \sum_{n \in Coh} g_{i,j}^H H(n) \hat{f}_j \qquad (3)$$

The subscripts i, l, and j refer to an i-th UE, an l-th analog receive beam, and a j-th analog transmit beam, respectively, Coh is a coherence factor in the frequency domain across subcarriers, and n represents an n-th subcarrier in the frequency domain. The respective CIR that indicates at least some channel matrix information included in H(n) may be estimated and/or derived by the UE based at least in part on using equation (3), information about reference signal(s) transmitted by a network node, and reference signal(s) received at the UE.

As described below, each UE may transmit, to the network node, a respective CIR report that includes one or more CIRs (e.g., one or more frequency domain averaged post-analog-beamformed CIRs) that are based at least in part on the set of analog receive beams assigned to the UE and/or the set of analog transmit beams used by the network node. The network node may use the CIR reports to select which UEs are co-scheduled for MU-MIMO communications, which UEs are not co-scheduled together for MU-MIMO communications, which analog transmit beams are used by the network node, and/or which respective analog receive beam is used by the respective UE to optimize the MU-MIMO communications. That is, the network node may select the UEs, the analog transmit beams (e.g., via analog transmit beamforming weights), and/or the analog receive beams (e.g., via analog receive beamforming weights) that increase data throughput and/or reduce data recovery errors in the MU-MIMO communications.

As indicated above, FIG. 6 is provided as an example. Other examples may differ from what is described with regard to FIG. 6.

Figure 7:
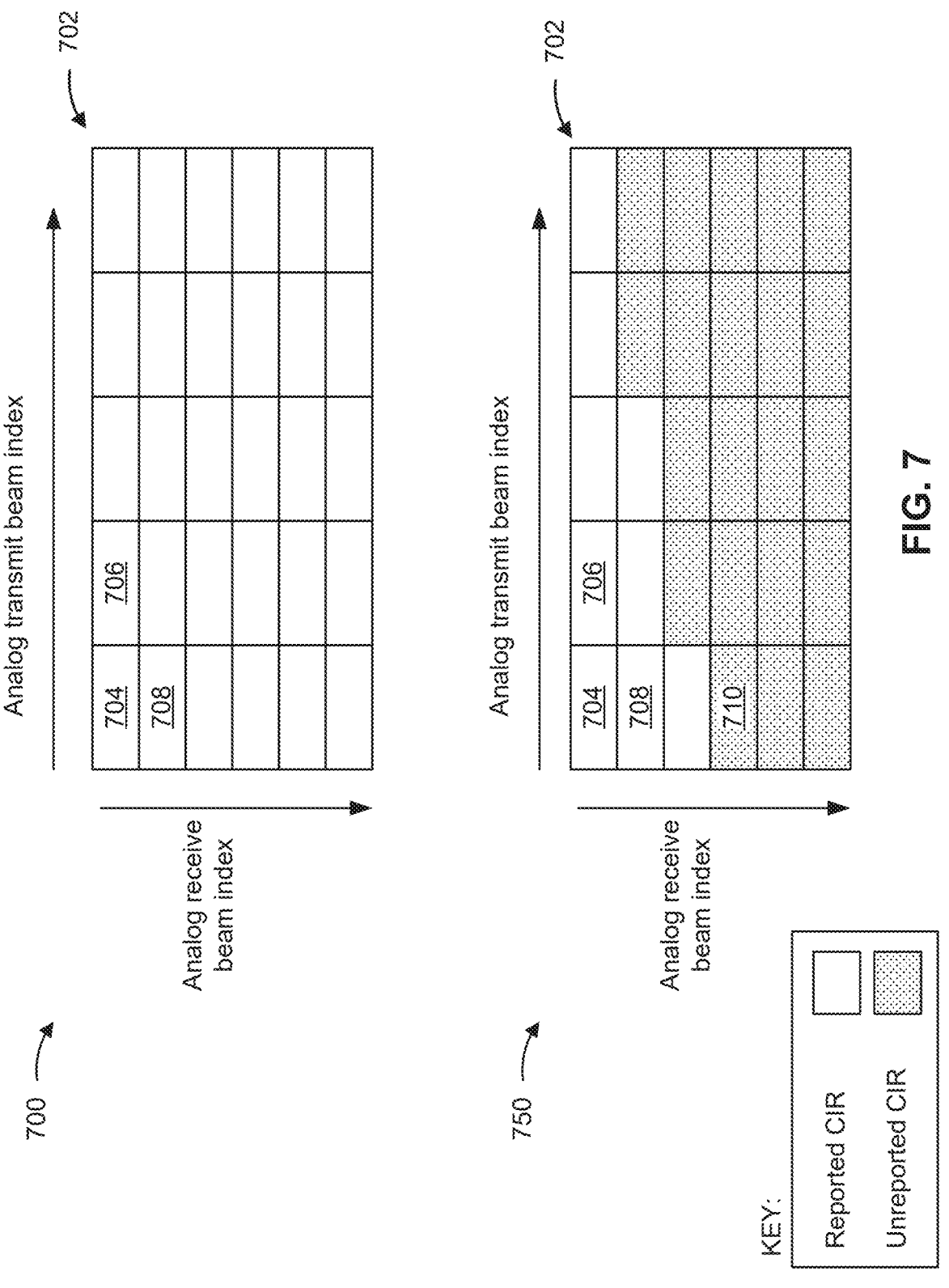
FIG. 7 is a diagram illustrating a first example and a second example of channel impulse response reporting, in accordance with the present disclosure.

FIG. 7 is a diagram illustrating a first example 700 and a second example 750 of CIR reporting, in accordance with the present disclosure.

A network node may use a set of analog transmit beams and/or may configure a UE with a set of analog receive beams for a MU-MIMO selection procedure. The set of analog transmit beams may include J beams and the set of analog receive beams may include L beams, where J and L are integers that may have equal values or unequal values. As part of performing the MU-MIMO selection procedure, the network node may transmit a respective reference signal on each analog transmit beam in the set of analog transmit beams, and the UE may receive each respective reference signal using each analog receive beam in the set of analog receive beams. For instance, the UE may iteratively cycle through the set of analog receive beams to receive the respective reference signal using each analog receive beam and/or generate a respective set of measurement metrics based at least in part on the respective reference signal.

The first example 700 includes a beam matrix 702 that illustrates singular pairings of the beams included in the set of analog transmit beams and the set of analog receive beams. The rows of the beam matrix 702 are partitioned by analog receive beam indices and the columns of the beam matrix 702 are partitioned by analog transmit beam indices. To illustrate, matrix entry 704 may be a first singular pairing between a first analog transmit beam (e.g., transmit beam index 0) in the set of analog transmit beams and a first analog receive beam (e.g., receive beam index 0) in the set of analog receive beams, and matrix entry 706 may be a second singular pairing between a second analog transmit beam (e.g., transmit beam index 1) in the set of analog transmit beams and the first analog receive beam (e.g., receive beam index 0) in the set of analog receive beams. Accordingly, each matrix entry in the first row of the beam matrix 702 is a respective singular pairing that includes the first analog receive beam and a respective analog transmit beam in the set of analog transmit beams. In a similar manner, each matrix entry in the first column of the beam matrix 702 is a respective singular pairing that includes the first analog transmit beam and a respective analog receive beam in the set of analog receive beams. For instance, matrix entry 708 is a singular pairing between the first analog transmit beam and a second analog receive beam in the set of analog receive beams. While the beam matrix 702 includes J=5 analog transmit beams and L=6 analog receive beams, other examples may include different numbers and/or combinations of analog transmit beams and analog receive beams.

A UE may generate a post-analog-beamformed CIR for each singular pairing included in the beam matrix 702 based at least in part on generating a set of measurement metrics using the singular pairing. Alternatively, or additionally, the UE may include each post-analog-beamformed CIR associated with the beam matrix 702 in a CIR report that the UE transmits to a network node. The inclusion of each post-analog beamformed CIR in a CIR report is shown by FIG. 7 through the use of solid white for each matrix entry (and corresponding post-analog-beamformed CIR) that is included in the CIR report. Accordingly, in the first example 700, the UE may indicate 5×6=30 post-analog-beamformed CIRs, where the number of analog receive beams used to generate the CIR report differs from the number of analog transmit beams used to generate the CIR report. In other examples, the CIR report may be based on a same number of analog transmit beams and analog receive beams. To reduce signaling overhead and/or a number of bits, the UE may indicate the post-analog-beamformed CIR using quantized information. To illustrate, a CIR may be expressed using amplitude information, phase information, and/or time delay information, and the UE may include quantized amplitude information, quantized phase information, and/or quantized time delay information in a CIR report.

The second example 750 includes the beam matrix 702 described with regard to the first example 700. In the second example 750, the UE may return a subset of post-analog-beamformed CIRs. For instance, the UE may generate 30 post-analog-beamformed CIRs as described with regard to the first example 700, and may include only a subset of the 30 post-analog-beamformed CIRs in the CIR report. The inclusion of each post-analog beamformed CIR in a CIR report is shown by FIG. 7 through the use of solid white for each matrix entry (and corresponding post-analog-beamformed CIR) that is included in the CIR report and a dotted pattern for each matrix entry (and corresponding post-analog-beamformed CIR) that is excluded from the CIR report. To illustrate, the UE may include a post-analog-beamformed CIR associated with matrix entry 704 in the CIR report and may exclude a post-analog-beamformed CIR associated with matrix entry 710 from the CIR report. In a similar manner as described with regard to the first example, the number of analog receive beams used to generate the CIR report (e.g., using a subset of CIRs) may differ from the number of analog transmit beams used to generate the CIR report, or may be the same number of analog transmit beams and analog receive beams.

A network node may configure and/or instruct the UE to return a subset of post-analog-beamformed CIRs from a total number of available post-analog-beamformed CIRs. Alternatively, or additionally, the network node may configure and/or instruct the UE to return no more than a maximum number of post-analog-beamformed CIRs from the total number of available post-analog-beamformed CIRs. That is, the network node may cap a number of CIRs to return to reduce signaling overhead and/or to configure a fixed payload size for the CIR report. While the network node may indicate a number of post-analog-beamformed CIRs to return (e.g., the subset and/or the maximum number), the UE may select which post-analog-beamformed CIRs to return. To illustrate, the UE may select a subset of post-analog beamformed CIRs based at least in part on a selection criterion, such as a first selection criterion that indicates to select the X post-analog beamformed CIRs that are associated with the highest CIR magnitude (e.g., out of the set), a second selection criterion that indicates to select X post-analog beamformed CIRs that are associated with the highest SNR measurement metrics, a third selection criterion that indicates to select the X post-analog beamformed CIRs that are associated with the lowest mean squared error (MSE) between the original reference signal at the network node and the reconstructed reference signal at the UE, and/or a fourth selection criterion that indicates to select the X post-analog beamformed CIRs that are associated with the highest channel capacity.

The network node may configure and/or instruct the UE to use one or more selection rules for selecting the X post-analog beamformed CIRs. For instance, the network node may configure the UE with a first selection rule that indicates to include at least one post-analog-beamformed CIR for every analog transmit beam (and/or every analog receive beam), a second selection rule that indicates to include at least one post-analog-beamformed CIR associated with a particular analog transmit beam index (and/or a particular analog receive beam index), and/or a third selection rule that indicates to include a post-analog-beamformed CIR that is associated with a particular singular pairing.

In other aspects, the network node may not provide the UE with a number of post-analog-beamformed CIRs to include in the CIR report. That is, the network node may not indicate X to the UE. As one example, the network node may indicate a selection criterion to use in selecting the one or more post-analog-beamformed CIRs, and the number of post-analog-beamformed CIRs included in the CIR report may be determined by the UE. To illustrate, the network node may transmit (e.g., in Layer 3 signaling) a CIR magnitude threshold, and indicate to return any post-analog-beamformed CIR that satisfies the CIR magnitude threshold. Alternatively, or additionally, the network node may indicate a minimum number of analog receive beam pairings to report for a particular analog transmit beam and/or every analog transmit beam (or vice versa for a minimum number of analog transmit beam pairings with an analog receive beam). That is, the network node may indicate a minimum number of post-analog-beamformed CIRs to return for a particular analog transmit beam (and/or every analog transmit beam), and each post-analog-beamformed CIR may be associated with a singular pairing with the particular analog transmit beam. Thus, the UE may determine to return more than the minimum number configured by the network node.

Configuring a UE with a set of analog receive beams to use for CIR reporting, and receiving a CIR report that is based at least in part on the set of analog receive beams, may provide a network node with information that enables the network node to select transmission parameters that result in decreased recovery errors, decreased data transfer latencies, and/or increased data throughput relative to using other information that may include errors (e.g., enhanced Type-II feedback) for selecting the transmission parameters. For example, the network node may use the CIR reports to select groups of UEs to co-schedule for MU-MIMO communications, analog transmit beams, and/or analog receive beams for the MU-MIMO transmission that decrease recovery errors, decrease data transfer latencies, and/or increase data throughput.

As indicated above, FIG. 7 is provided as an example. Other examples may differ from what is described with regard to FIG. 7.

Figure 8:
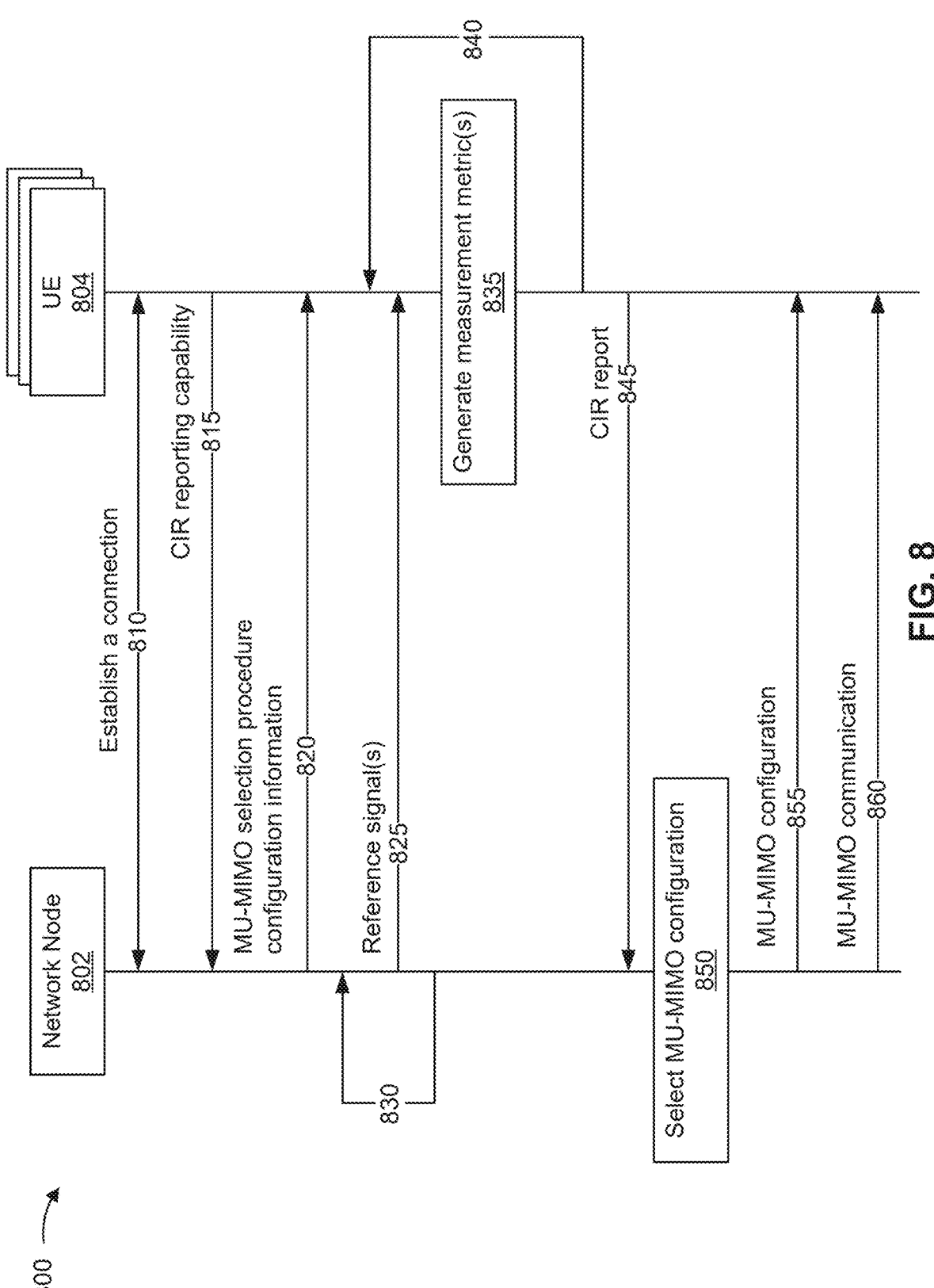
FIG. 8 is a diagram illustrating an example of a wireless communication process between a network node and multiple UEs, in accordance with the present disclosure.

FIG. 8 is a diagram illustrating an example 800 of a wireless communication process between a network node 802 (e.g., a network node 110) and multiple UEs 804 (e.g., multiple UEs 120), in accordance with the present disclosure. Descriptions below that refer to a single UE 804 may be applied to some or all of the multiple UEs 804. That is, one or more UEs included in the multiple UEs 804 may perform respective actions as described with regard to a single UE 804.

As shown by reference number 810, a network node 802 may establish respective connections with multiple UEs 804. To illustrate, a UE 804 may power up in a cell coverage area provided by the network node 802, and the UE 804 and the network node 802 may perform one or more procedures (e.g., a random access channel (RACH) procedure and/or an RRC procedure) to establish a wireless connection. As another example, a UE 804 may move into the cell coverage area provided by the network node 802 and may perform a handover from a source network node (e.g., another network node 110) to the network node 802. Alternatively, or additionally, the network node 802 and a UE 804 may communicate via the connection based at least in part on any combination of Layer 1 signaling (e.g., DCI and/or uplink control information (UCI)), Layer 2 signaling (e.g., a MAC CE), and/or Layer 3 signaling (e.g., RRC signaling). To illustrate, the network node 802 may request, via RRC signaling, UE capability information and/or a UE 804 may transmit, via RRC signaling, the UE capability information. As part of communicating via the connection, the network node 802 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 802 may transmit the configuration information via Layer 3 signaling at a first point in time associated with a UE 804 being tolerant of communication delays, and the network node 802 may transmit an activation of the configuration via Layer 2 signaling and/or Layer 1 signaling at a second point in time associated with the UE 804 being less tolerant to communication delays.

As shown by reference number 815, a UE 804 may transmit, and the network node 802 may receive, an indication of a CIR reporting capability. As one example, the UE 804 may indicate support for participating in a MU-MIMO selection procedure and/or may indicate support for CIR reporting.

For clarity, FIG. 8 illustrates the UE 804 transmitting the indication of the CIR reporting capability in a separate signaling transaction than establishing a connection with the network node 802 in the example 500. However, in some aspects, the UE 804 may transmit the indication of a CIR reporting capability as part of establishing a connection with the network node 802.

As shown by reference number 820, the network node 802 may transmit, and a UE 804 may receive, MU-MIMO selection procedure configuration information. To illustrate, as at least part of the MU-MIMO selection procedure configuration information, the network node 802 may indicate a set of analog receive beams and/or an instruction to report one or more post-analog-beamformed CIRs that are based at least in part on the set of analog receive beams. The set of analog receive beams may be UE-specific and/or assigned to a particular UE. Based at least in part on establishing a respective connection with the multiple UEs 804, the network node 802 may select a respective set of analog receive beams for each UE in the multiple UEs 804 to use for generating a respective CIR report and/or for respective post-analog-beamformed CIR reporting. Accordingly, the network node 802 may transmit a respective beam set indication to each UE 804 in the multiple UEs 804, and the respective beam set indication may indicate the respective set of analog receive beams that is associated with the UE and a respective instruction to use the respective set of analog receive beams for the respective post-analog-beamformed CIR reporting as described with regard to FIG. 6.

An instruction to generate post-analog-beamformed CIR(s) for post-analog-beamformed CIR reporting may indicate to report a subset of post-analog-beamformed CIRs from a total number of available post-analog-beamformed CIRs as described with regard to FIG. 7. Alternatively, or additionally, the instruction to generate the post-analog-beamformed CIR(s) may indicate a selection criterion and/or a selection rule to use in selecting which post-analog-beamformed CIR(s) to include in a CIR report, such as a number of post-analog-beamformed CIR(s) to include, a number of post-analog-beamformed CIRs to include for each analog transmit beam, and/or a threshold.

The network node 802 may select, for use in the MU-MIMO selection procedure, a set of analog transmit beams to use for transmission of one or more reference signals. For example, as described with regard to FIG. 6, the network node 802 may select a set of unitary beams (or nearly unitary beams). Alternatively, or additionally, the set of analog transmit beams may include only SSB beams, may partially include one or more SSB beams, or may not include any SSB beams. In some aspects, the network node 802 may indicate the set of analog transmit beams to a UE 804 as at least part of the MU-MIMO selection procedure configuration information. However, in other aspects, the network node 802 may not indicate the set of analog transmit beams to a UE 804.

The network node 802 may indicate the set of analog receive beams (and/or the analog transmit beams) in the MU-MIMO selection procedure configuration information in a variety of ways. As one example, the network node 802 may indicate a respective beam index of each analog receive beam (and/or each analog transmit beam) in the MU-MIMO selection procedure configuration information. As another example, the network node 802 may indicate a respective QCL source for each analog receive beam (and/or each analog transmit beam). The network node 802 may alternatively or additionally indicate a combination of one or more beam indices and/or QCL sources to indicate a set of analog beams (e.g., analog receive beams and/or analog transmit beams). The network node 802 may configure a beam matrix (e.g., an explicit beam matrix or an implicit beam matrix) at a UE 804 based at least in part on indicating both a set of analog receive beams and a set of analog transmit beams.

For clarity, FIG. 8 illustrates the network node 802 transmitting the indication of the MU-MIMO selection procedure configuration information in a single signaling transaction. However, in some aspects, the network node 802 may transmit the MU-MIMO selection procedure configuration information in multiple transactions, such as by transmitting an indication of the set of analog receive beams in a first signaling transaction, an indication of the set of analog transmit beams in a second signaling transaction, and/or the instruction to generate post-analog-beamformed CIR(s) in a third signaling transaction.

As shown by reference number 825, the network node 802 may transmit, and a UE 804 may receive, one or more reference signals. For example, the network node 802 may transmit an SSB, a CSI-RS, and/or a DMRS using one or more of the analog transmit beams in the set of analog transmit beams selected by the network node 802. As shown by reference number 830, the network node 802 may iteratively and/or continuously transmit the reference signal(s), resulting in multiple instances of a reference signal and/or multiple occasions of the reference signal. As one example, the network node 802 may continuously transmit a single reference signal during multiple time partitions, using a same beam in each time partition or using a different beam in each time partition. As another example, the network node may transmit a different reference signal during a respective time partition (e.g., using a same beam or different beams). Alternatively, or additionally, the network node 802 may simultaneously and/or contemporaneously transmit multiple reference signals using a respective analog transmit beam for each reference signal.

As shown by reference number 835, a UE 804 may generate one or more measurement metrics and/or CIRs (e.g., a post-analog-beamformed CIR) using the reference signal(s) transmitted by the network node 802 and/or one or more analog receive beams in the set of analog receive beams assigned to the UE 804. Example measurement metrics may include CSI, RSSI, SNR, CQI, RSRP, SINR, and/or RSRQ. To illustrate, the UE 804 may generate a first set of measurement metrics that are based at least in part on a reference signal received by the UE 804 using a first analog receive beam and a second set of measurement metrics that are based at least in part on a reference signal (e.g., the same reference signal or a different reference signal) received by the UE 804 using a second analog receive beam. An example of a post-analog-beamformed CIR is frequency-domain averaged post-analog-beamformed CIR as described above.

In some aspects, the UE 804 may generate a respective set of measurement metrics for each singular pairing of an analog receive beam in a set of analog receive beams and an analog transmit beam in a set of analog transmit beams as described with regard to FIG. 7. Alternatively, or additionally, the UE 804 may generate each post-analog-beamformed CIR for each singular beam pairing in a beam matrix that is based at least in part on a set of analog receive beams and a set of analog transmit beams. Each measurement metric and/or CIR may be based at least in part on a respective time partition and/or a respective instance (or portion) of a reference signal. Accordingly, as shown by reference number 840, the UE 804 may iteratively generate the measurement metric(s) and/or CIR(s) based at least in part on different instances of a reference signal, different analog receive beams, and/or different analog transmit beams.

As shown by reference number 845, a UE 804 may transmit, and the network node 802 may receive, a CIR report that indicates and/or includes one or more post-analog-beamformed CIRs, such as the CIRs described with regard to reference number 840. The UE 804 may generate a CIR report in a manner as described with regard to FIG. 7. To illustrate, the UE 804 may generate the CIR report based at least in part on indicating quantized CIR information, such as quantized amplitude information and/or quantized phase information for one or more of the post-analog-beamformed CIRs. The CIR report generated by the UE 804 may include and/or indicate each respective post-analog-beamformed CIR generated by the UE 804 (e.g., each post-analog-beamformed CIR associated with each singular pairing and/or each respective matrix element of a beam matrix). In other aspects, the CIR report may include a subset of post-analog-beamformed CIRs that are associated with the beam matrix. That is, the UE 804 may select a subset of post-analog-beamformed CIRs from a total number of available post-analog-beamformed CIRs that are associated with the beam matrix. Each post-analog-beamformed CIR may be associated with a respective matrix element (e.g., a singular beam pairing) of the beam matrix.

The UE 804 may select the subset of post-analog-beamformed CIRs based at least in part on one or more selection criteria. For instance, the network node 802 may indicate a selection criterion and/or a selection rule to use in generating a CIR report as described above, and the UE 804 may select the subset of post-analog-beamformed CIRs using the selection criterion and/or the selection rule. In other examples, the UE 804 may use a selection criterion and/or a selection rule that is specified by a communication standard. Examples of the UE 804 selecting a subset of post-analog-beamformed CIRs include the UE 804 selecting X number of post-analog-beamformed CIRs based at least in part on a selection criterion and/or a selection rule from the network node 802, selecting post-analog-beamformed CIRs that satisfy a threshold indicated by the network node 802 and/or selected by the UE 804, and/or including at least one post-analog-beamformed CIR for every analog transmit beam (and/or every analog receive beam) based at least in part on a selection rule indicated by the network node 802. In some aspects, the UE 804 may select the number of post-analog-beamformed CIRs to include in the CIR report based at least in part on the network node 802 indicating the number, while in other aspects, the UE 804 may select the number of post-analog-beamformed CIRs to include in the CIR report, such as based at least in part on a minimum number indicate by the network node 802 and/or a threshold. The UE 804 may select the post-analog-beamformed CIRs using unequal and/or non-proportional beam pairings, such as by selecting a set of post-analog-beamformed CIRs that are based at least in part on more distinct analog receive beams than distinct analog transmit beams (or vice versa). In other examples, the UE 804 may select a set of post-analog-beamformed CIRs that are based at least in part on equal numbers of distinct analog receive beams and distinct analog transmit beams.

As described with regard to FIG. 6 and FIG. 7, the network node 802 may receive multiple CIR reports. Each CIR report may be generated by and/or associated with a respective UE 804 of the multiple UEs 804.

As shown by reference number 850, the network node 802 may select a MU-MIMO configuration (e.g., a MU-MIMO scheduling configuration) based at least in part on the CIR report(s). For instance, the network node 802 may analyze the CIR reports and identify two UEs that may use compatible analog transmit beams (e.g., from the network node 802) and/or compatible analog receive beams (at each UE 804) that mitigate interference with one another. Accordingly, the network node may select a MU-MIMO configuration that co-schedules the two UEs in a MU-MIMO communication and/or includes the analog transmit beams and the analog receive beams that the CIR reports indicate are compatible. Based at least in part on selecting a MU-MIMO configuration, the network node 802 may transmit, and one or more UEs 804 may receive, an indication of the MU-MIMO configuration as shown by reference number 855.

As shown by reference number 860, the network node 802 may transmit, and one or more UEs 804 may receive, a MU-MIMO communication, and the MU-MIMO communication may be based at least in part on the MU-MIMO configuration selected as described with regard to reference number 850. For instance, as part of the MU-MIMO communication, the network node 802 may transmit first user data to a first UE 804 using a first analog transmit beam indicated by the MU-MIMO configuration, and may transmit second user data to a second UE 804 using a second analog transmit beam indicated by the MU-MIMO configuration. The first UE 804 may receive the first user data using a first analog receive beam indicated by the MU-MIMO configuration, and the second UE 804 may receive the second user data using a second analog receive beam indicated by the MU-MIMO configuration.

Configuring a UE with a set of analog receive beams to use for CIR reporting, and receiving a CIR report that characterizes at least part of a channel matrix between a network node and one or more UEs, may enable a network node to select transmission parameters that result in decreased recovery errors, decreased data transfer latencies, and/or increased data throughput relative to using other information (e.g., enhanced Type-II feedback) for selecting the transmission parameters. For example, the network node may use the CIR reports to select groups of UEs to co-schedule for MU-MIMO communications, analog transmit beams, and/or analog receive beams for the MU-MIMO transmission that decrease recovery errors, decrease data transfer latencies, and/or increase data throughput.

Alternatively, or additionally, the use of CIR reports from multiple UEs may simplify the process of obtaining channel matrix information at a network node. Simplifying the process may make obtaining at least some channel matrix information realizable, may reduce power consumption at a network node, and/or may reduce a latency associated with obtaining the channel matrix information.

As indicated above, FIG. 8 is provided as an example. Other examples may differ from what is described with regard to FIG. 8.

Figure 9:
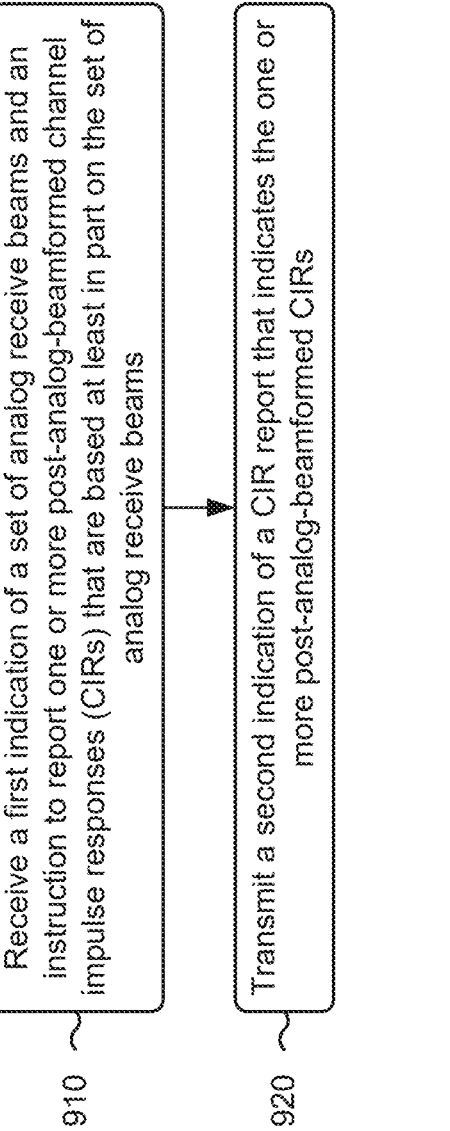
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with post-analog beam-formed CIR reporting for MU-MIMO scheduling and beam-forming.

As shown in FIG. 9, in some aspects, process 900 may include receiving a first indication of a set of analog receive beams and an instruction to report one or more post-analog-beamformed CIRs that are based at least in part on the set of analog receive beams (block 910). For example, the UE (e.g., using reception component 1102 and/or communication manager 1106, depicted in FIG. 11) may receive a first indication of a set of analog receive beams and an instruction to report one or more post-analog-beamformed CIRs that are based at least in part on the set of analog receive beams, as described above.

As further shown in FIG. 9, in some aspects, process 900 may include transmitting a second indication of a CIR report that indicates the one or more post-analog-beamformed CIRs (block 920). For example, the UE (e.g., using transmission component 1104 and/or communication manager 1106, depicted in FIG. 11) may transmit a second indication of a CIR report that indicates the one or more post-analog-beamformed CIRs, as described above.

Process 900 may include additional aspects, such as any single aspect or any combination of aspects described below and/or in connection with one or more other processes described elsewhere herein.

In a first aspect, the set of analog receive beams are UE-specific.

In a second aspect, process 900 includes generating, for each analog receive beam in the set of analog receive beams, a respective set of measurement metrics using multiple instances of a reference signal.

In a third aspect, the reference signal includes at least one of a synchronization signal block, a CSI-RS, or a DMRS.

In a fourth aspect, the multiple instances of the reference signal are based at least in part on multiple time partitions.

In a fifth aspect, process 900 includes generating a respective post-analog-beamformed CIR of the one or more post-analog-beamformed CIRs based at least in part on the multiple instances of the reference signal.

In a sixth aspect, generating the respective post-analog-beamformed CIR includes generating the respective post-analog-beamformed CIR as a respective frequency-domain averaged post-analog-beamformed CIR.

In a seventh aspect, the CIR report indicates each post-analog-beamformed CIR of the one or more post-analog-beamformed CIRs using at least one of a quantized amplitude, or a quantized phase.

In an eighth aspect, the CIR report indicates the one or more post-analog-beamformed CIRs based at least in part on a beam matrix, the beam matrix being based at least in part on the set of analog receive beams, and a set of analog transmit beams.

In a ninth aspect, each post-analog-beamformed CIR of the one or more post-analog-beamformed CIRs is associated with a respective matrix element of the beam matrix, and the respective matrix element is associated with a respective singular pairing of an analog transmit beam in the set of analog transmit beams and an analog receive beam in the set of analog receive beams.

In a tenth aspect, the one or more post-analog-beamformed CIRs indicated in the CIR report are based at least in part on a first number of distinct analog receive beams in the set of analog receive beams and a second number of distinct analog transmit beams in the set of analog transmit beams, and the first number and the second number are unequal.

In an eleventh aspect, the one or more post-analog-beamformed CIRs are associated with a subset of matrix elements of the beam matrix.

In a twelfth aspect, the beam matrix is a configured beam matrix.

In a thirteenth aspect, each post-analog-beamformed CIR of the one or more post-analog-beamformed CIRs is associated with a respective pairing between an analog transmit beam in the set of analog transmit beams and an analog receive beam in the set of analog receive beams.

In a fourteenth aspect, the instruction to generate the one or more post-analog-beamformed CIRs indicates to report a subset of post-analog-beamformed CIRs from a total number of available post-analog-beamformed CIRs, and process 900 includes selecting, as the subset of post-analog-beamformed CIRs, the one or more post-analog-beamformed CIRs from the total number of available post-analog-beamformed CIRs using a selection criterion.

In a fifteenth aspect, the instruction to generate the one or more post-analog-beamformed CIRs indicates a selection criterion to use in selecting the one or more post-analog-beamformed CIRs, and process 900 includes selecting the one or more post-analog-beamformed CIRs based at least in part on the selection criterion.

In a sixteenth aspect, selecting the one or more post-analog-beamformed CIRs includes selecting a number of post-analog-beamformed CIRs to include in the CIR report.

In a seventeenth aspect, process 900 includes receiving MU-MIMO selection procedure configuration information that indicates a set of analog transmit beams to use for reception of one or more reference signals.

In an eighteenth aspect, the set of analog transmit beams are a set of unitary beams.

In a nineteenth aspect, the set of analog transmit beams are a set of SSB beams.

In a twentieth aspect, the set of analog transmit beams do not include an SSB beam.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
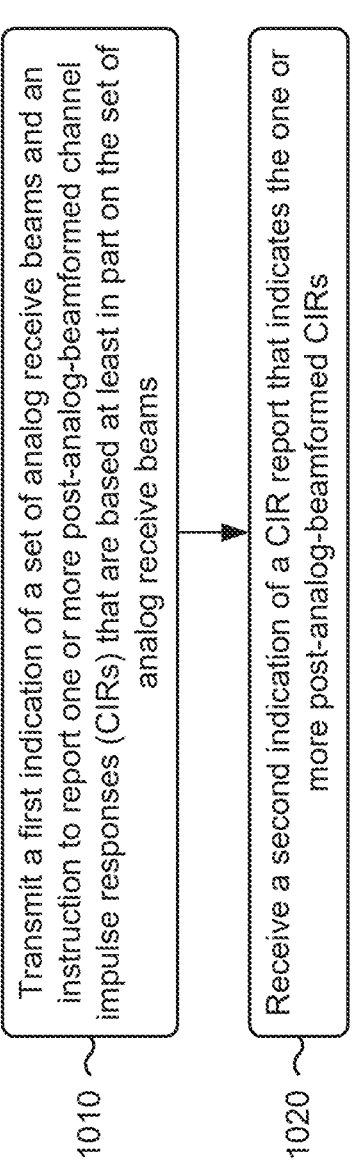
FIG. 10 is a diagram illustrating an example process performed, for example, at a network node or an apparatus of a network node, in accordance with the present disclosure.

FIG. 10 is a diagram illustrating an example process 1000 performed, for example, at a network node or an apparatus of a network node, in accordance with the present disclosure. Example process 1000 is an example where the apparatus or the network node (e.g., network node 110) performs operations associated with post-analog beamformed CIR reporting for MU-MIMO scheduling and beamforming.

As shown in FIG. 10, in some aspects, process 1000 may include transmitting a first indication of a set of analog receive beams and an instruction to report one or more post-analog-beamformed CIRs that are based at least in part on the set of analog receive beams (block 1010). For example, the network node (e.g., using transmission component 1204 and/or communication manager 1206, depicted in FIG. 12) may transmit a first indication of a set of analog receive beams and an instruction to report one or more post-analog-beamformed CIRs that are based at least in part on the set of analog receive beams, as described above.

As further shown in FIG. 10, in some aspects, process 1000 may include receiving a second indication of a CIR report that indicates the one or more post-analog-beamformed CIRs (block 1020). For example, the network node (e.g., using reception component 1202 and/or communication manager 1206, depicted in FIG. 12) may receive a second indication of a CIR report that indicates the one or more post-analog-beamformed CIRs, as described above.

Process 1000 may include additional aspects, such as any single aspect or any combination of aspects described below and/or in connection with one or more other processes described elsewhere herein.

In a first aspect, the set of analog receive beams is a first set of analog receive beams assigned to a first UE included in a group of UEs, and process 1000 includes selecting a respective set of analog receive beams for each UE in the group of UEs to use for respective post-analog-beamformed CIR reporting, and transmitting a respective beam set indication to each UE in the group of UEs, the respective beam set indication indicating the respective set of analog receive beams that is associated with the UE, and a respective instruction to use the respective set of analog receive beams for the respective post-analog-beamformed CIR reporting.

In a second aspect, process 1000 includes selecting, for a MU-MIMO selection procedure, a set of analog transmit beams to use for transmission of one or more reference signals.

In a third aspect, the set of analog transmit beams are a set of unitary beams.

In a fourth aspect, the set of analog transmit beams are a set of SSB beams.

In a fifth aspect, the set of analog transmit beams do not include an SSB beam.

In a sixth aspect, process 1000 includes transmitting a third indication of the set of analog transmit beams.

In a seventh aspect, process 1000 includes transmitting a reference signal using each beam in the set of analog transmit beams, and the transmitting includes transmitting multiple instances of the reference signal.

In an eighth aspect, the reference signal includes at least one of a synchronization signal block, a CSI-RS, or a DMRS.

In a ninth aspect, the multiple instances of the reference signal are based at least in part on multiple time partitions.

In a tenth aspect, the CIR report indicates each post-analog-beamformed CIR of the one or more post-analog-beamformed CIRs using at least one of a quantized amplitude, or a quantized phase.

In an eleventh aspect, the CIR report indicates the one or more post-analog-beamformed CIRs based at least in part on a beam matrix, the beam matrix being based at least in part on the set of analog receive beams, and a set of analog transmit beams.

In a twelfth aspect, each post-analog-beamformed CIR of the one or more post-analog-beamformed CIRs is associated with a respective matrix element of the beam matrix, and the respective matrix element is associated with a respective singular pairing of an analog transmit beam in the set of analog transmit beams and an analog receive beam in the set of analog receive beams.

In a thirteenth aspect, the one or more post-analog-beamformed CIRs indicated in the CIR report are based at least in part on a first number of distinct analog receive beams in the set of analog receive beams and a second number of distinct analog transmit beams in the set of analog transmit beams, and the first number and the second number are unequal.

In a fourteenth aspect, the one or more post-analog-beamformed CIRs are associated with a subset of matrix elements of the beam matrix.

In a fifteenth aspect, the beam matrix is a configured beam matrix.

In a sixteenth aspect, each post-analog-beamformed CIR of the one or more post-analog-beamformed CIRs is associated with a respective pairing between an analog transmit beam in the set of analog transmit beams and an analog receive beam in the set of analog receive beams.

In a seventeenth aspect, the instruction to generate the one or more post-analog-beamformed CIRs indicates a selection criterion to use in selecting the one or more post-analog-beamformed CIRs.

In an eighteenth aspect, receiving the CIR report includes receiving the CIR report as one of multiple CIR reports, each CIR report of the multiple CIR reports is associated with a respective UE in a group of UEs, and process 1000 includes co-scheduling MU-MIMO that includes at least two UEs in the group of UEs based at least in part on the multiple CIR reports.

In a nineteenth aspect, the instruction to report the one or more post-analog-beamformed CIRs indicates to report a subset of post-analog-beamformed CIRs from a total number of available post-analog-beamformed CIRs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
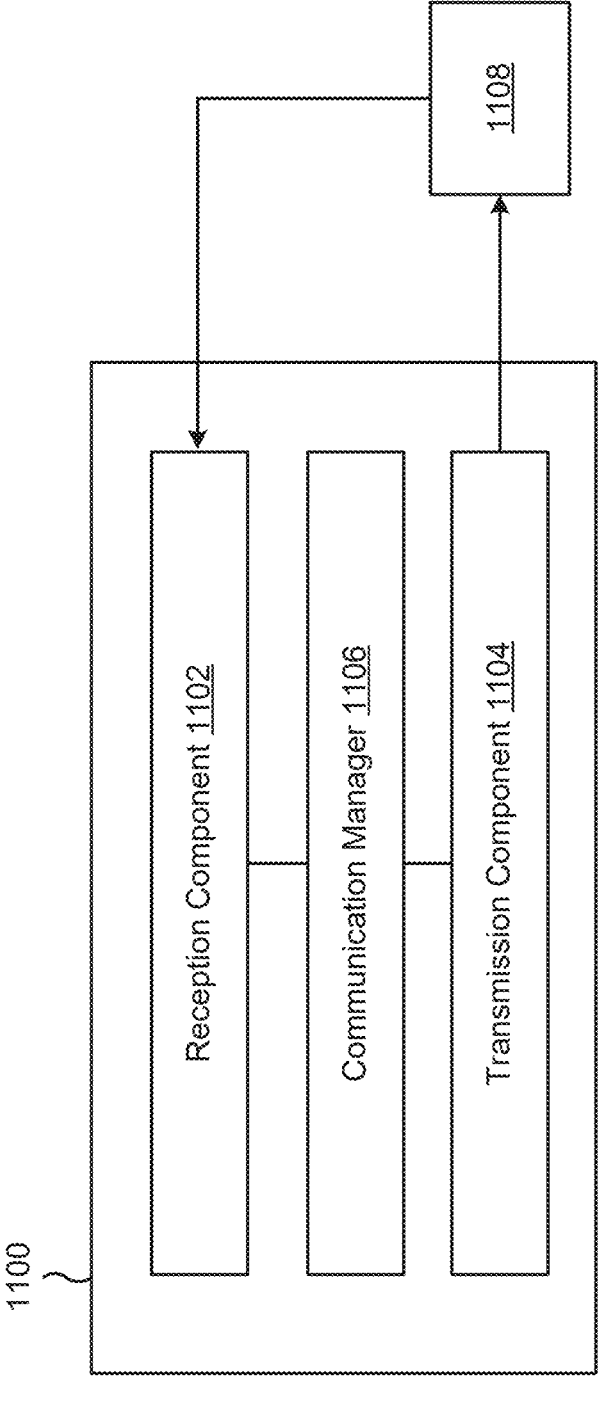
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 1 and FIG. 2. Additionally, or alternatively, one or more components shown in FIG. 11 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 1 and FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 1 and FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive a first indication of a set of analog receive beams and an instruction to report one or more post-analog-beamformed CIRs that are based at least in part on the set of analog receive beams. The transmission component 1104 may transmit a second indication of a CIR report that indicates the one or more post-analog-beamformed CIRs.

The communication manager 1106 may generate, for each analog receive beam in the set of analog receive beams, a respective set of measurement metrics using multiple instances of a reference signal. Alternatively, or additionally, the communication manager 1106 may generate a respective post-analog-beamformed CIR of the one or more post-analog-beamformed CIRs based at least in part on the multiple instances of the reference signal. In some aspects, the reception component 1102 may receive MU-MIMO selection procedure configuration information that indicates a set of analog transmit beams to use for reception of one or more reference signals.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
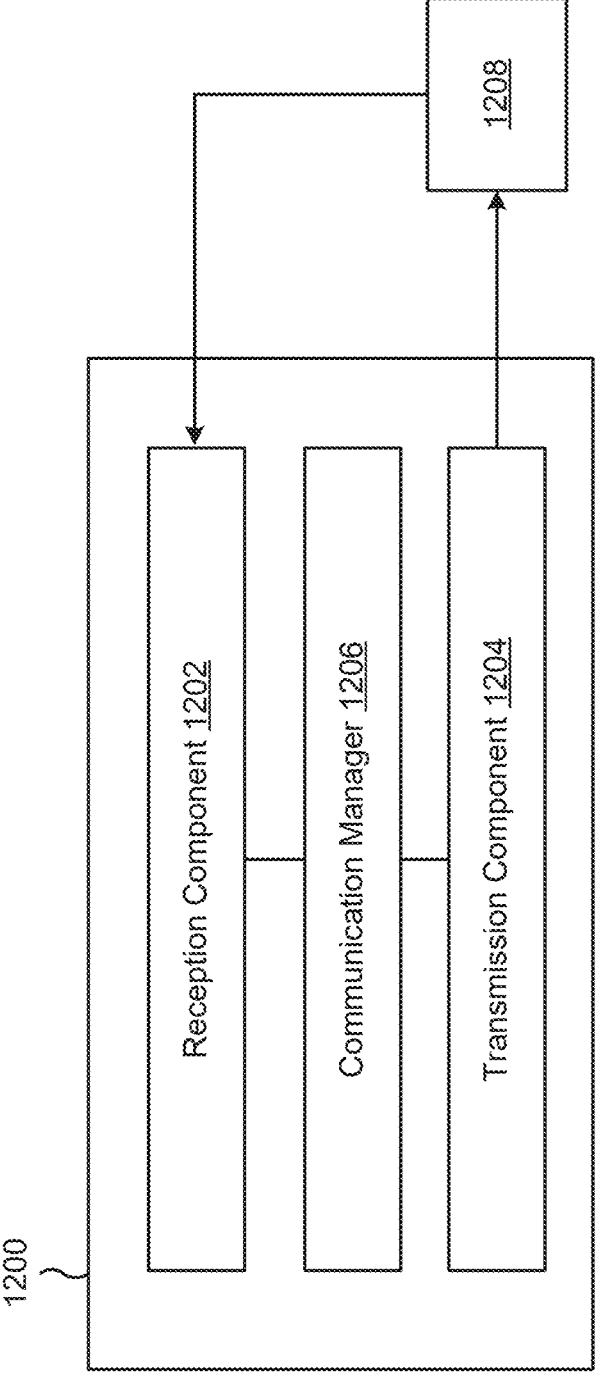
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 1 and FIG. 2. Additionally, or alternatively, one or more components shown in FIG. 12 may be implemented within one or more components described in connection with FIG. 1 and FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the network node described in connection with FIG. 1 and FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the network node described in connection with FIG. 1 and FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit a first indication of a set of analog receive beams and an instruction to report one or more post-analog-beamformed CIRs that are based at least in part on the set of analog receive beams. The reception component 1202 may receive a second indication of a CIR report that indicates the one or more post-analog-beamformed CIRs.

The communication manager 1206 may select, for a MU-MIMO selection procedure, a set of analog transmit beams to use for transmission of one or more reference signals. In some aspects, the transmission component 1204 may transmit a third indication of the set of analog transmit beams. Alternatively, or additionally, the transmission component 1204 may transmit a reference signal using each beam in the set of analog transmit beams, the transmitting including transmitting multiple instances of the reference signal.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving a first indication of a set of analog receive beams and an instruction to report one or more post-analog-beamformed channel impulse responses (CIRs) that are based at least in part on the set of analog receive beams; and transmitting a second indication of a CIR report that indicates the one or more post-analog-beamformed CIRs.

Aspect 2: The method of Aspect 1, wherein the set of analog receive beams are UE-specific.

Aspect 3: The method of any of Aspects 1-2, further comprising: generating, for each analog receive beam in the set of analog receive beams, a respective set of measurement metrics using multiple instances of a reference signal.

Aspect 4: The method of Aspect 3, wherein the reference signal comprises at least one of: a synchronization signal block, a channel state information reference signal (CSI-RS), or a demodulation reference signal (DMRS).

Aspect 5: The method of Aspect 3 or Aspect 4, wherein the multiple instances of the reference signal are based at least in part on multiple time partitions.

Aspect 6: The method of any one of Aspects 3-5, further comprising: generating a respective post-analog-beamformed CIR of the one or more post-analog-beamformed CIRs based at least in part on the multiple instances of the reference signal.

Aspect 7: The method of Aspect 6, wherein generating the respective post-analog-beamformed CIR comprises: generating the respective post-analog-beamformed CIR as a respective frequency-domain averaged post-analog-beamformed CIR.

Aspect 8: The method of any of Aspects 1-7, wherein the CIR report indicates each post-analog-beamformed CIR of the one or more post-analog-beamformed CIRs using at least one of: a quantized amplitude, or a quantized phase.

Aspect 9: The method of any of Aspects 1-8, wherein the CIR report indicates the one or more post-analog-beamformed CIRs based at least in part on a beam matrix, the beam matrix being based at least in part on: the set of analog receive beams, and a set of analog transmit beams.

Aspect 10: The method of Aspect 9, wherein each post-analog-beamformed CIR of the one or more post-analog-beamformed CIRs is associated with a respective matrix element of the beam matrix, and wherein the respective matrix element is associated with a respective singular pairing of an analog transmit beam in the set of analog transmit beams and an analog receive beam in the set of analog receive beams.

Aspect 11: The method of Aspect 9 or Aspect 10, wherein the one or more post-analog-beamformed CIRs indicated in the CIR report are based at least in part on a first number of distinct analog receive beams in the set of analog receive beams and a second number of distinct analog transmit beams in the set of analog transmit beams, and wherein the first number and the second number are unequal.

Aspect 12: The method of Aspect 9, wherein the one or more post-analog-beamformed CIRs are associated with a subset of matrix elements of the beam matrix.

Aspect 13: The method of any one of Aspects 9-12, wherein the beam matrix is a configured beam matrix.

Aspect 14: The method of any one of Aspects 9-13, wherein each post-analog-beamformed CIR of the one or more post-analog-beamformed CIRs is associated with a respective pairing between an analog transmit beam in the set of analog transmit beams and an analog receive beam in the set of analog receive beams.

Aspect 15: The method of any of Aspects 1-14, wherein the instruction to generate the one or more post-analog-beamformed CIRs indicates to report a subset of post-analog-beamformed CIRs from a total number of available post-analog-beamformed CIRs, and wherein the method further comprises: selecting, as the subset of post-analog-beamformed CIRs, the one or more post-analog-beamformed CIRs from the total number of available post-analog-beamformed CIRs using a selection criterion.

Aspect 16: The method of any of Aspects 1-15, wherein the instruction to generate the one or more post-analog-beamformed CIRs indicates a selection criterion to use in selecting the one or more post-analog-beamformed CIRs, and wherein the method further comprises: selecting the one or more post-analog-beamformed CIRs based at least in part on the selection criterion.

Aspect 17: The method of Aspect 16, wherein selecting the one or more post-analog-beamformed CIRs comprises: selecting a number of post-analog-beamformed CIRs to include in the CIR report.

Aspect 18: The method of any of Aspects 1-17, further comprising: receiving multiple user multiple-input-multiple-output (MU-MIMO) selection procedure configuration information that indicates a set of analog transmit beams to use for reception of one or more reference signals.

Aspect 19: The method of Aspect 18, wherein the set of analog transmit beams are a set of unitary beams.

Aspect 20: The method of Aspect 18, wherein the set of analog transmit beams are a set of synchronization signal block (SSB) beams.

Aspect 21: The method of Aspect 18, wherein the set of analog transmit beams do not include a synchronization signal block (SSB) beam.

Aspect 22: A method of wireless communication performed by a network node, comprising: transmitting a first indication of a set of analog receive beams and an instruction to report one or more post-analog-beamformed channel impulse responses (CIRs) that are based at least in part on the set of analog receive beams; and receiving a second indication of a CIR report that indicates the one or more post-analog-beamformed CIRs.

Aspect 23: The method of any of Aspects 22, wherein the set of analog receive beams is a first set of analog receive beams assigned to a first user equipment (UE) included in a group of UEs, and wherein the method further comprises: selecting a respective set of analog receive beams for each UE in the group of UEs to use for respective post-analog-beamformed CIR reporting; and transmitting a respective beam set indication to each UE in the group of UEs, the respective beam set indication indicating: the respective set of analog receive beams that is associated with the UE, and a respective instruction to use the respective set of analog receive beams for the respective post-analog-beamformed CIR reporting.

Aspect 24: The method of Aspect 22 or Aspect 23, further comprising: selecting, for a multiple user multiple-input-multiple-output (MU-MIMO) selection procedure, a set of analog transmit beams to use for transmission of one or more reference signals.

Aspect 25: The method of Aspect 24, wherein the set of analog transmit beams are a set of unitary beams.

Aspect 26: The method of Aspect 24 or Aspect 25, wherein the set of analog transmit beams are a set of synchronization signal block (SSB) beams.

Aspect 27 The method of Aspect 24 or Aspect 25, wherein the set of analog transmit beams do not include a synchronization signal block (SSB) beam.

Aspect 28: The method of any one of Aspects 23-26, further comprising: transmitting a third indication of the set of analog transmit beams.

Aspect 29: The method of any one of Aspects 23-28, further comprising: transmitting a reference signal using each beam in the set of analog transmit beams, the transmitting comprising transmitting multiple instances of the reference signal.

Aspect 30: The method of Aspect 29, wherein the reference signal comprises at least one of: a synchronization signal block, a channel state information reference signal (CSI-RS), or a demodulation reference signal (DMRS).

Aspect 31: The method of Aspect 29 or Aspect 30, wherein the multiple instances of the reference signal are based at least in part on multiple time partitions.

Aspect 32: The method of any one of Aspects 23-31, wherein the CIR report indicates each post-analog-beamformed CIR of the one or more post-analog-beamformed CIRs using at least one of: a quantized amplitude, or a quantized phase.

Aspect 33: The method of Aspects 23-32, wherein the CIR report indicates the one or more post-analog-beamformed CIRs based at least in part on a beam matrix, the beam matrix being based at least in part on: the set of analog receive beams, and a set of analog transmit beams.

Aspect 34: The method of Aspect 33, wherein each post-analog-beamformed CIR of the one or more post-analog-beamformed CIRs is associated with a respective matrix element of the beam matrix, and wherein the respective matrix element is associated with a respective singular pairing of an analog transmit beam in the set of analog transmit beams and an analog receive beam in the set of analog receive beams.

Aspect 35: The method of Aspect 33, wherein the one or more post-analog-beamformed CIRs indicated in the CIR report are based at least in part on a first number of distinct analog receive beams in the set of analog receive beams and a second number of distinct analog transmit beams in the set of analog transmit beams, and wherein the first number and the second number are unequal.

Aspect 36: The method of Aspect 35, wherein the one or more post-analog-beamformed CIRs are associated with a subset of matrix elements of the beam matrix.

Aspect 37: The method of Aspect 33, wherein the beam matrix is a configured beam matrix.

Aspect 38: The method of Aspect 33, wherein each post-analog-beamformed CIR of the one or more post-analog-beamformed CIRs is associated with a respective pairing between an analog transmit beam in the set of analog transmit beams and an analog receive beam in the set of analog receive beams.

Aspect 39: The method of any one of Aspects 22-24 wherein the instruction to report the one or more post-analog-beamformed CIRs indicates to report a subset of post-analog-beamformed CIRs from a total number of available post-analog-beamformed CIRs.

Aspect 40: The method of any one of Aspects 22-24, wherein the instruction to generate the one or more post-analog-beamformed CIRs indicates a selection criterion to use in selecting the one or more post-analog-beamformed CIRs.

Aspect 41: The method of any one of Aspects 22-24, wherein receiving the CIR report comprises: receiving the CIR report as one of multiple CIR reports, wherein each CIR report of the multiple CIR reports is associated with a respective user equipment (UE) in a group of UEs, and wherein the method further comprises: co-scheduling multiple user (MU) multiple-input-multiple-output (MIMO) that includes at least two UEs in the group of UEs based at least in part on the multiple CIR reports.

Aspect 42: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-21.

Aspect 43: An apparatus for wireless communication at a device, the apparatus comprising one or more memories and one or more processors coupled to the one or more memories, the one or more processors configured to cause the device to perform the method of one or more of Aspects 1-21.

Aspect 44: An apparatus for wireless communication, the apparatus comprising at least one means for performing the method of one or more of Aspects 1-21.

Aspect 45: A non-transitory computer-readable medium storing code for wireless communication, the code comprising instructions executable by one or more processors to perform the method of one or more of Aspects 1-21.

Aspect 46: A non-transitory computer-readable medium storing a set of instructions for wireless communication, the set of instructions comprising one or more instructions that, when executed by one or more processors of a device, cause the device to perform the method of one or more of Aspects 1-21.

Aspect 47: A device for wireless communication, the device comprising a processing system that includes one or more processors and one or more memories coupled with the one or more processors, the processing system configured to cause the device to perform the method of one or more of Aspects 1-21.

Aspect 48: An apparatus for wireless communication at a device, the apparatus comprising one or more memories and one or more processors coupled to the one or more memories, the one or more processors individually or collectively configured to cause the device to perform the method of one or more of Aspects 1-21.

Aspect 49: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 22-41.

Aspect 50: An apparatus for wireless communication at a device, the apparatus comprising one or more memories and one or more processors coupled to the one or more memories, the one or more processors configured to cause the device to perform the method of one or more of Aspects 22-41.

Aspect 51: An apparatus for wireless communication, the apparatus comprising at least one means for performing the method of one or more of Aspects 22-41.

Aspect 52: A non-transitory computer-readable medium storing code for wireless communication, the code comprising instructions executable by one or more processors to perform the method of one or more of Aspects 22-41.

Aspect 53: A non-transitory computer-readable medium storing a set of instructions for wireless communication, the set of instructions comprising one or more instructions that, when executed by one or more processors of a device, cause the device to perform the method of one or more of Aspects 22-41.

Aspect 54: A device for wireless communication, the device comprising a processing system that includes one or more processors and one or more memories coupled with the one or more processors, the processing system configured to cause the device to perform the method of one or more of Aspects 22-41.

Aspect 55: An apparatus for wireless communication at a device, the apparatus comprising one or more memories and one or more processors coupled to the one or more memories, the one or more processors individually or collectively configured to cause the device to perform the method of one or more of Aspects 22-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:
   one or more memories; and
   one or more processors, coupled to the one or more memories, configured to cause the UE to:
      receive a first indication of a set of analog receive beams and an instruction to report one or more post-analog-beamformed channel impulse responses (CIRs) that are based at least in part on the set of analog receive beams; and
      transmit a second indication of a CIR report that indicates the one or more post-analog-beamformed CIRs.

2. The apparatus of claim 1, wherein the one or more processors are further configured to cause the UE to:
   generate, for each analog receive beam in the set of analog receive beams, a respective set of measurement metrics using multiple instances of a reference signal.

3. The apparatus of claim 2, wherein the one or more processors are further configured to cause the UE to:
   generate a respective post-analog-beamformed CIR of the one or more post-analog-beamformed CIRs based at least in part on the multiple instances of the reference signal.

4. The apparatus of claim 3, wherein the one or more processors, to cause the UE to generate the respective post-analog-beamformed CIR, are configured to cause the UE to:
   generate the respective post-analog-beamformed CIR as a respective frequency-domain averaged post-analog-beamformed CIR.

5. The apparatus of claim 1, wherein the CIR report indicates each post-analog-beamformed CIR of the one or more post-analog-beamformed CIRs using at least one of:
   a quantized amplitude, or
   a quantized phase.

6. The apparatus of claim 1, wherein the CIR report indicates the one or more post-analog-beamformed CIRs based at least in part on a beam matrix, the beam matrix being based at least in part on:
   the set of analog receive beams, and
   a set of analog transmit beams.

7. The apparatus of claim 1, wherein the instruction to generate the one or more post-analog-beamformed CIRs indicates to report a subset of post-analog-beamformed CIRs from a total number of available post-analog-beamformed CIRs, and
   wherein the one or more processors are further configured to cause the UE to:
      select, as the subset of post-analog-beamformed CIRs, the one or more post-analog-beamformed CIRs from the total number of available post-analog-beamformed CIRs using a selection criterion.

8. The apparatus of claim 1, wherein the instruction to generate the one or more post-analog-beamformed CIRs indicates a selection criterion to use in selecting the one or more post-analog-beamformed CIRs, and
   wherein the one or more processors are further configured to cause the UE to:
      select the one or more post-analog-beamformed CIRs based at least in part on the selection criterion.

9. The apparatus of claim 1, wherein the one or more processors are further configured to cause the UE to:
   receive multiple user multiple-input-multiple-output (MU-MIMO) selection procedure configuration information that indicates a set of analog transmit beams to use for reception of one or more reference signals.

10. A method of wireless communication performed by a user equipment (UE), comprising:
   receiving a first indication of a set of analog receive beams and an instruction to report one or more post-analog-beamformed channel impulse responses (CIRs) that are based at least in part on the set of analog receive beams; and
   transmitting a second indication of a CIR report that indicates the one or more post-analog-beamformed CIRs.

11. The method of claim 10, further comprising:
   generating, for each analog receive beam in the set of analog receive beams, a respective set of measurement metrics using multiple instances of a reference signal.

12. The method of claim 10, wherein the CIR report indicates each post-analog-beamformed CIR of the one or more post-analog-beamformed CIRs using at least one of:
   a quantized amplitude, or
   a quantized phase.

13. The method of claim 10, wherein the CIR report indicates the one or more post-analog-beamformed CIRs based at least in part on a beam matrix, the beam matrix being based at least in part on:
   the set of analog receive beams, and
   a set of analog transmit beams.

14. The method of claim 10, wherein the instruction to generate the one or more post-analog-beamformed CIRs indicates to report a subset of post-analog-beamformed CIRs from a total number of available post-analog-beamformed CIRs, and
   wherein the method further comprises:
      selecting, as the subset of post-analog-beamformed CIRs, the one or more post-analog-beamformed CIRs from the total number of available post-analog-beamformed CIRs using a selection criterion.

15. The method of claim 10, wherein the instruction to generate the one or more post-analog-beamformed CIRs indicates a selection criterion to use in selecting the one or more post-analog-beamformed CIRs, and
   wherein the method further comprises:
      selecting the one or more post-analog-beamformed CIRs based at least in part on the selection criterion.

16. The method of claim 10, further comprising:

receiving multiple user multiple-input-multiple-output (MU-MIMO) selection procedure configuration information that indicates a set of analog transmit beams to use for reception of one or more reference signals.

17. A non-transitory computer-readable medium storing a set of instructions for wireless communication, the set of instructions comprising:

one or more instructions that, when executed by one or more processors of a user equipment (UE), cause the UE to:

receive a first indication of a set of analog receive beams and an instruction to report one or more post-analog-beamformed channel impulse responses (CIRs) that are based at least in part on the set of analog receive beams; and transmit a second indication of a CIR report that indicates the one or more post-analog-beamformed CIRs.

18. The non-transitory computer-readable medium of claim 17, wherein the one or more instructions further cause the UE to:

generate, for each analog receive beam in the set of analog receive beams, a respective set of measurement metrics using multiple instances of a reference signal.

19. The non-transitory computer-readable medium of claim 17, wherein the one or more instructions further cause the UE to:

generate a respective post-analog-beamformed CIR of the one or more post-analog-beamformed CIRs based at least in part on the multiple instances of the reference signal.

20. The non-transitory computer-readable medium of claim 19, wherein the one or more instructions, that cause the UE to generate the respective post-analog-beamformed CIR, cause the UE to:

generate the respective post-analog-beamformed CIR as a respective frequency-domain averaged post-analog-beamformed CIR.

\* \* \* \* \*